(12) United States Patent
Watanabe et al.

(10) Patent No.: US 8,848,009 B2
(45) Date of Patent: Sep. 30, 2014

(54) OPTICAL SCANNING DEVICE AND IMAGE FORMING APPARATUS

(71) Applicants: Naoto Watanabe, Kanagawa (JP); Toshiaki Tokita, Kanagawa (JP); Kohji Sakai, Tokyo (JP); Nobuaki Kubo, Tokyo (JP)

(72) Inventors: Naoto Watanabe, Kanagawa (JP); Toshiaki Tokita, Kanagawa (JP); Kohji Sakai, Tokyo (JP); Nobuaki Kubo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 116 days.

(21) Appl. No.: 13/624,182

(22) Filed: Sep. 21, 2012

(65) Prior Publication Data

US 2013/0076851 A1 Mar. 28, 2013

(30) Foreign Application Priority Data

Sep. 22, 2011 (JP) .................................. 2011-207540

(51) Int. Cl.
| | |
|---|---|
| *B41J 2/385* | (2006.01) |
| *B41J 2/435* | (2006.01) |
| *B41J 15/14* | (2006.01) |
| *B41J 27/00* | (2006.01) |
| *G02B 26/08* | (2006.01) |
| *G02B 26/10* | (2006.01) |
| *G02B 26/12* | (2006.01) |
| *B41J 2/47* | (2006.01) |
| *G02B 27/00* | (2006.01) |

(52) U.S. Cl.
CPC ............... *G02B 26/123* (2013.01); *B41J 2/473* (2013.01); *G02B 27/0018* (2013.01)

USPC ........... 347/134; 347/232; 347/243; 347/261; 359/204.2; 359/204.3; 359/207.8; 359/207.9

(58) Field of Classification Search
USPC ......... 347/134, 232, 241, 243, 258, 260, 261; 359/204.2, 204.3, 205.1, 207.8, 207.9
See application file for complete search history.

(56) References Cited

U.S. PATENT DOCUMENTS

| | | | |
|---|---|---|---|
| 5,831,758 | A | 11/1998 | Sakai et al. |
| 5,999,345 | A | 12/1999 | Nakajima et al. |
| 6,166,842 | A | 12/2000 | Aoki et al. |
| 6,256,133 | B1 | 7/2001 | Suzuki et al. |
| 6,347,004 | B1 | 2/2002 | Suzuki et al. |
| 6,366,384 | B1 | 4/2002 | Aoki et al. |

(Continued)

FOREIGN PATENT DOCUMENTS

| | | |
|---|---|---|
| JP | 2010-134411 | 6/2010 |
| JP | 2011-013289 | 1/2011 |

*Primary Examiner* — Justin Seo
*Assistant Examiner* — Kendrick Liu
(74) *Attorney, Agent, or Firm* — Oblon, Spivak, McClelland, Maier & Neustadt, L.L.P.

(57) ABSTRACT

An optical scanning device scanning scan target surfaces in a first direction with light includes: a light source emitting first and second light beams corresponding to two of the scan target surfaces; an optical deflector including a reflection surface on which the emitted first and second light beams are obliquely incident while being separated from each other in a second direction perpendicular to the first direction, and deflecting the first and second light beams; a scanning lens disposed on respective optical paths of the deflected first and second light beams; and a branching optical element transmitting therethrough most of the first light beam transmitted through the scanning lens, and reflecting most of the second light beam transmitted through the scanning lens. The deflected first and second light beams intersect between the optical deflector and the branching optical element, when projected on a plane perpendicular to the first direction.

12 Claims, 40 Drawing Sheets

(56) References Cited

U.S. PATENT DOCUMENTS

| | | |
|---|---|---|
| 6,376,837 B1 | 4/2002 | Itabashi et al. |
| 6,388,792 B1 | 5/2002 | Atsuumi et al. |
| 6,448,998 B1 | 9/2002 | Suzuki et al. |
| 6,509,995 B1 | 1/2003 | Suzuki et al. |
| 6,596,985 B2 | 7/2003 | Sakai et al. |
| 7,215,354 B1 | 5/2007 | Sakai et al. |
| 2002/0080428 A1 | 6/2002 | Suzuki et al. |
| 2003/0107788 A1 | 6/2003 | Hayashi et al. |
| 2003/0128413 A1 | 7/2003 | Suzuki et al. |
| 2003/0179429 A1 | 9/2003 | Takanashi et al. |
| 2003/0214694 A1 | 11/2003 | Sakai |
| 2003/0218788 A1 | 11/2003 | Sakai et al. |
| 2004/0090520 A1 | 5/2004 | Sakai et al. |
| 2004/0125193 A1 | 7/2004 | Kubo |
| 2004/0184127 A1 | 9/2004 | Nakajima et al. |
| 2004/0196507 A1 | 10/2004 | Sakai |
| 2004/0263968 A1 | 12/2004 | Kobayashi et al. |
| 2006/0077500 A1 | 4/2006 | Hayashi et al. |
| 2006/0187294 A1 | 8/2006 | Saisho et al. |
| 2006/0209166 A1* | 9/2006 | Suzuki et al. ............... 347/231 |
| 2007/0091398 A1 | 4/2007 | Ueda et al. |
| 2007/0211324 A1 | 9/2007 | Sakai et al. |
| 2007/0211326 A1 | 9/2007 | Saisho et al. |
| 2007/0216316 A1 | 9/2007 | Hirano et al. |
| 2007/0253048 A1 | 11/2007 | Sakai et al. |
| 2008/0025759 A1 | 1/2008 | Ichii et al. |
| 2008/0055672 A1 | 3/2008 | Watanabe et al. |
| 2008/0055692 A1 | 3/2008 | Saisho et al. |
| 2008/0068689 A1 | 3/2008 | Saisho et al. |
| 2008/0068693 A1 | 3/2008 | Hayashi et al. |
| 2008/0100895 A1 | 5/2008 | Hayashi et al. |
| 2008/0123159 A1 | 5/2008 | Hayashi et al. |
| 2008/0192319 A1 | 8/2008 | Miyatake et al. |
| 2008/0204840 A1 | 8/2008 | Watanabe et al. |
| 2008/0218827 A1 | 9/2008 | Watanabe et al. |
| 2008/0219601 A1 | 9/2008 | Arai et al. |
| 2008/0285104 A1 | 11/2008 | Arai et al. |
| 2009/0052944 A1 | 2/2009 | Kubo et al. |
| 2009/0059333 A1 | 3/2009 | Sakai |
| 2009/0060583 A1 | 3/2009 | Amada et al. |
| 2009/0065685 A1 | 3/2009 | Watanabe et al. |
| 2009/0080907 A1 | 3/2009 | Hagiya et al. |
| 2009/0195636 A1 | 8/2009 | Arai et al. |
| 2009/0220256 A1 | 9/2009 | Suhara et al. |
| 2009/0231557 A1 | 9/2009 | Kubo |
| 2009/0314927 A1 | 12/2009 | Tatsuno et al. |
| 2010/0060710 A1 | 3/2010 | Kubo |
| 2010/0060963 A1 | 3/2010 | Miyake et al. |
| 2010/0091083 A1 | 4/2010 | Itami et al. |
| 2010/0118366 A1 | 5/2010 | Tokita et al. |
| 2010/0183337 A1 | 7/2010 | Kubo et al. |
| 2010/0194843 A1 | 8/2010 | Sakai et al. |
| 2010/0328417 A1 | 12/2010 | Saisho et al. |
| 2011/0002025 A1 | 1/2011 | Tokita et al. |
| 2011/0052263 A1* | 3/2011 | Tatsuno et al. ............... 399/221 |
| 2011/0063594 A1 | 3/2011 | Sakai |
| 2011/0090549 A1 | 4/2011 | Sakai |
| 2011/0216386 A1* | 9/2011 | Watanabe et al. .......... 359/204.3 |
| 2011/0235132 A1 | 9/2011 | Saisho et al. |
| 2011/0316959 A1 | 12/2011 | Saisho et al. |
| 2011/0318057 A1 | 12/2011 | Watanabe |
| 2012/0050444 A1 | 3/2012 | Sakai |
| 2012/0177409 A1 | 7/2012 | Arai et al. |

* cited by examiner

FIG. 16

| | INCIDENT SURFACE | EMISSION SURFACE |
|---|---|---|
| Ry | 215.350mm | −378.886mm |
| Rz(0) | −47.081mm | −20.853mm |
| K | 0 | 0 |
| $A_1$ | 0 | 0 |
| $A_2$ | 0 | 0 |
| $A_3$ | 0 | 0 |
| $A_4$ | $-5.900913 \times 10^{-7}$ | $-2.399118 \times 10^{-7}$ |
| $A_5$ | 0 | 0 |
| $A_6$ | $-1.692412 \times 10^{-10}$ | $-1.655128 \times 10^{-10}$ |
| $A_7$ | 0 | 0 |
| $A_8$ | $2.356812 \times 10^{-13}$ | $8.652968 \times 10^{-14}$ |
| $A_9$ | 0 | 0 |
| $A_{10}$ | $-9.676735 \times 10^{-17}$ | $-1.463441 \times 10^{-17}$ |
| $A_{11}$ | 0 | 0 |
| $A_{12}$ | $1.812106 \times 10^{-20}$ | $-8.050011 \times 10^{-23}$ |
| $A_{13}$ | 0 | 0 |
| $A_{14}$ | $-1.318898 \times 10^{-24}$ | $1.580321 \times 10^{-26}$ |
| $B_1$ | $-4.480818 \times 10^{-5}$ | $-2.421462 \times 10^{-5}$ |
| $B_2$ | $7.011819 \times 10^{-6}$ | $4.23457 \times 10^{-6}$ |
| $B_3$ | $1.265625 \times 10^{-8}$ | $-4.453345 \times 10^{-12}$ |
| $B_4$ | $-2.889054 \times 10^{-9}$ | $-1.827908 \times 10^{-9}$ |
| $B_5$ | $-3.079971 \times 10^{-12}$ | $-3.567187 \times 10^{-14}$ |
| $B_6$ | $8.994291 \times 10^{-13}$ | $4.039437 \times 10^{-13}$ |
| $B_7$ | $-9.755113 \times 10^{-17}$ | $-3.081208 \times 10^{-16}$ |
| $B_8$ | $-8.215962 \times 10^{-17}$ | $-1.845591 \times 10^{-17}$ |

FIG. 24

(HORIZONTAL INCIDENCE: d1 = 0mm)

|  | INCIDENT SURFACE | EMISSION SURFACE |
|---|---|---|
| $R_y$ | 216.743mm | −360.493mm |
| $R_z(0)$ | 130.000mm | −33.280mm |
| K | 0 | 0 |
| $A_1$ | 0 | 0 |
| $A_2$ | 0 | 0 |
| $A_3$ | 0 | 0 |
| $A_4$ | $-4.832074 \times 10^{-7}$ | $-1.774706 \times 10^{-7}$ |
| $A_5$ | 0 | 0 |
| $A_6$ | $-1.990969 \times 10^{-10}$ | $-1.725881 \times 10^{-10}$ |
| $A_7$ | 0 | 0 |
| $A_8$ | $2.406272 \times 10^{-13}$ | $8.912606 \times 10^{-14}$ |
| $A_9$ | 0 | 0 |
| $A_{10}$ | $-9.646743 \times 10^{-17}$ | $-1.539569 \times 10^{-17}$ |
| $A_{11}$ | 0 | 0 |
| $A_{12}$ | $1.805787 \times 10^{-20}$ | $-8.226578 \times 10^{-23}$ |
| $A_{13}$ | 0 | 0 |
| $A_{14}$ | $-1.318898 \times 10^{-24}$ | $1.580321 \times 10^{-25}$ |
| $B_1$ | $-2.936945 \times 10^{-5}$ | $-2.472427 \times 10^{-5}$ |
| $B_2$ | $5.142739 \times 10^{-6}$ | $6.847864 \times 10^{-6}$ |
| $B_3$ | $-1.217672 \times 10^{-6}$ | $-7.097147 \times 10^{-9}$ |
| $B_4$ | $-8.290231 \times 10^{-10}$ | $-6.448992 \times 10^{-10}$ |
| $B_5$ | $2.594219 \times 10^{-12}$ | $-3.065946 \times 10^{-12}$ |
| $B_6$ | $2.749516 \times 10^{-13}$ | $1.066197 \times 10^{-13}$ |
| $B_7$ | $2.076963 \times 10^{-16}$ | $7.924087 \times 10^{-16}$ |
| $B_8$ | $3.295236 \times 10^{-17}$ | $7.110649 \times 10^{-17}$ |

FIG. 26

(HORIZONTAL INCIDENCE: d1 = 0.405mm)

| | INCIDENT SURFACE | EMISSION SURFACE |
|---|---|---|
| $R_y$ | 216.743mm | -360.493mm |
| $R_z(0)$ | 130.000mm | -33.280mm |
| $K$ | 0 | 0 |
| $A_1$ | 0 | 0 |
| $A_2$ | 0 | 0 |
| $A_3$ | 0 | 0 |
| $A_4$ | $-4.832074 \times 10^{-7}$ | $-1.774706 \times 10^{-7}$ |
| $A_5$ | 0 | 0 |
| $A_6$ | $-1.990969 \times 10^{-10}$ | $-1.725881 \times 10^{-10}$ |
| $A_7$ | 0 | 0 |
| $A_8$ | $2.406272 \times 10^{-13}$ | $8.912606 \times 10^{-14}$ |
| $A_9$ | 0 | 0 |
| $A_{10}$ | $-9.646743 \times 10^{-17}$ | $-1.539569 \times 10^{-17}$ |
| $A_{11}$ | 0 | 0 |
| $A_{12}$ | $1.805787 \times 10^{-20}$ | $-8.226578 \times 10^{-23}$ |
| $A_{13}$ | 0 | 0 |
| $A_{14}$ | $-1.318898 \times 10^{-24}$ | $1.580321 \times 10^{-25}$ |
| $B_1$ | $1.120019 \times 10^{-6}$ | $-7.422505 \times 10^{-6}$ |
| $B_2$ | $5.044545 \times 10^{-6}$ | $6.796038 \times 10^{-6}$ |
| $B_3$ | $-5.793311 \times 10^{-9}$ | $2.708254 \times 10^{-10}$ |
| $B_4$ | $-8.020205 \times 10^{-10}$ | $-6.463333 \times 10^{-10}$ |
| $B_5$ | $4.198833 \times 10^{-12}$ | $-1.637124 \times 10^{-12}$ |
| $B_6$ | $2.917469 \times 10^{-13}$ | $1.075782 \times 10^{-13}$ |
| $B_7$ | $-7.044621 \times 10^{-17}$ | $1.053964 \times 10^{-15}$ |
| $B_8$ | $3.083243 \times 10^{-17}$ | $7.422284 \times 10^{-17}$ |

FIG. 28

(HORIZONTAL INCIDENCE: d1 = 0.810mm)

| | INCIDENT SURFACE | EMISSION SURFACE |
|---|---|---|
| $R_y$ | 216.743mm | −360.493mm |
| $R_z(0)$ | 130.000mm | −33.280mm |
| K | 0 | 0 |
| $A_1$ | 0 | 0 |
| $A_2$ | 0 | 0 |
| $A_3$ | 0 | 0 |
| $A_4$ | $-4.832074 \times 10^{-7}$ | $-1.774706 \times 10^{-7}$ |
| $A_5$ | 0 | 0 |
| $A_6$ | $-1.990969 \times 10^{-10}$ | $-1.725881 \times 10^{-10}$ |
| $A_7$ | 0 | 0 |
| $A_8$ | $2.406272 \times 10^{-13}$ | $8.912606 \times 10^{-14}$ |
| $A_9$ | 0 | 0 |
| $A_{10}$ | $-9.646743 \times 10^{-17}$ | $-1.539569 \times 10^{-17}$ |
| $A_{11}$ | 0 | 0 |
| $A_{12}$ | $1.805787 \times 10^{-20}$ | $-8.226578 \times 10^{-23}$ |
| $A_{13}$ | 0 | 0 |
| $A_{14}$ | $-1.318898 \times 10^{-24}$ | $1.580321 \times 10^{-25}$ |
| $B_1$ | $7.676702 \times 10^{-5}$ | $3.794378 \times 10^{-5}$ |
| $B_2$ | $5.469423 \times 10^{-6}$ | $7.254548 \times 10^{-6}$ |
| $B_3$ | $-1.428955 \times 10^{-10}$ | $1.324222 \times 10^{-8}$ |
| $B_4$ | $-5.666665 \times 10^{-10}$ | $-7.488555 \times 10^{-10}$ |
| $B_5$ | $4.333695 \times 10^{-12}$ | $1.448464 \times 10^{-12}$ |
| $B_6$ | $3.463167 \times 10^{-13}$ | $2.292674 \times 10^{-13}$ |
| $B_7$ | $-6.650941 \times 10^{-16}$ | $5.911218 \times 10^{-16}$ |
| $B_8$ | $3.207231 \times 10^{-17}$ | $8.578748 \times 10^{-17}$ |

FIG. 30

(HORIZONTAL INCIDENCE: dl = 0.810mm)

| | INCIDENT SURFACE | EMISSION SURFACE |
|---|---|---|
| $R_y$ | 216.743mm | −360.493mm |
| $R_z(0)$ | 130.000mm | −33.280mm |
| K | 0 | 0 |
| $A_1$ | 0 | 0 |
| $A_2$ | 0 | 0 |
| $A_3$ | 0 | 0 |
| $A_4$ | $-4.832074 \times 10^{-7}$ | $-1.774706 \times 10^{-7}$ |
| $A_5$ | 0 | 0 |
| $A_6$ | $-1.990969 \times 10^{-10}$ | $-1.725881 \times 10^{-10}$ |
| $A_7$ | 0 | 0 |
| $A_8$ | $2.406272 \times 10^{-13}$ | $8.912606 \times 10^{-14}$ |
| $A_9$ | 0 | 0 |
| $A_{10}$ | $-9.646743 \times 10^{-17}$ | $-1.539569 \times 10^{-17}$ |
| $A_{11}$ | 0 | 0 |
| $A_{12}$ | $1.805787 \times 10^{-20}$ | $-8.226578 \times 10^{-23}$ |
| $A_{13}$ | 0 | 0 |
| $A_{14}$ | $-1.318898 \times 10^{-24}$ | $1.580321 \times 10^{-25}$ |
| $B_1$ | $7.676702 \times 10^{-5}$ | $3.794378 \times 10^{-5}$ |
| $B_2$ | $5.469423 \times 10^{-6}$ | $7.254548 \times 10^{-6}$ |
| $B_3$ | $-1.428955 \times 10^{-10}$ | $1.324222 \times 10^{-6}$ |
| $B_4$ | $-5.666665 \times 10^{-10}$ | $-7.488555 \times 10^{-10}$ |
| $B_5$ | $4.333685 \times 10^{-12}$ | $1.448464 \times 10^{-12}$ |
| $B_6$ | $3.463167 \times 10^{-13}$ | $2.292874 \times 10^{-13}$ |
| $B_7$ | $-6.650941 \times 10^{-16}$ | $5.911218 \times 10^{-16}$ |
| $B_8$ | $3.207231 \times 10^{-17}$ | $8.578748 \times 10^{-17}$ |

FIG. 31

(OBLIQUE INCIDENCE)  (Type 1)

| | INCIDENT SURFACE | EMISSION SURFACE |
|---|---|---|
| Ry | 216.743mm | −360.493mm |
| Rz(0) | 130.000mm | −33.280mm |
| K | 0 | 0 |
| $A_1$ | 0 | 0 |
| $A_2$ | 0 | 0 |
| $A_3$ | 0 | 0 |
| $A_4$ | $-4.832074 \times 10^{-7}$ | $-1.774706 \times 10^{-7}$ |
| $A_5$ | 0 | 0 |
| $A_6$ | $-1.990969 \times 10^{-10}$ | $-1.725881 \times 10^{-10}$ |
| $A_7$ | 0 | 0 |
| $A_8$ | $2.406272 \times 10^{-13}$ | $8.912606 \times 10^{-14}$ |
| $A_9$ | 0 | 0 |
| $A_{10}$ | $-9.646743 \times 10^{-17}$ | $-1.539569 \times 10^{-17}$ |
| $A_{11}$ | 0 | 0 |
| $A_{12}$ | $1.805787 \times 10^{-20}$ | $-8.226578 \times 10^{-23}$ |
| $A_{13}$ | 0 | 0 |
| $A_{14}$ | $-1.318898 \times 10^{-24}$ | $1.580321 \times 10^{-25}$ |
| $B_1$ | $-7.065810 \times 10^{-5}$ | $-4.881139 \times 10^{-5}$ |
| $B_2$ | $4.781852 \times 10^{-6}$ | $6.752240 \times 10^{-6}$ |
| $B_3$ | $-2.742005 \times 10^{-8}$ | $-2.086833 \times 10^{-8}$ |
| $B_4$ | $-1.045287 \times 10^{-9}$ | $-9.859781 \times 10^{-10}$ |
| $B_5$ | $9.549334 \times 10^{-12}$ | $-1.633096 \times 10^{-12}$ |
| $B_6$ | $5.123738 \times 10^{-13}$ | $3.558974 \times 10^{-13}$ |
| $B_7$ | $-9.621510 \times 10^{-16}$ | $4.731154 \times 10^{-16}$ |
| $B_8$ | $-4.420712 \times 10^{-17}$ | $6.507859 \times 10^{-18}$ |

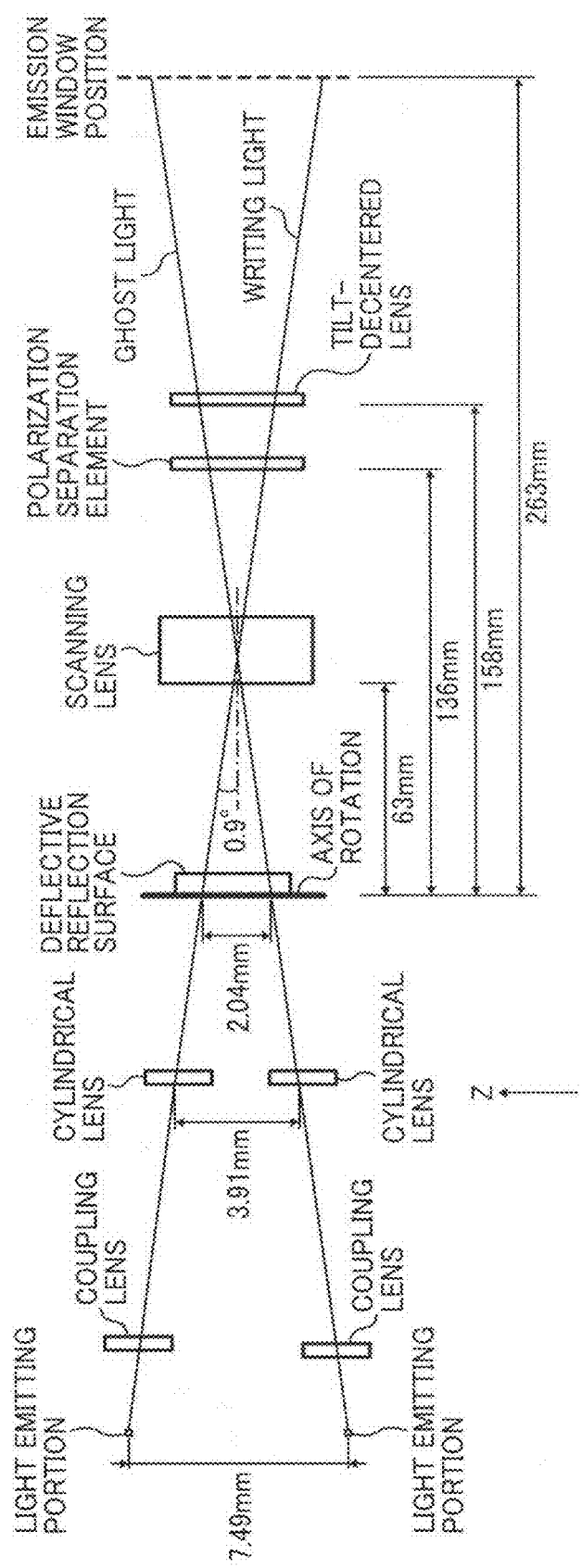

FIG. 48

(Type 2)

| | INCIDENT SURFACE | EMISSION SURFACE |
|---|---|---|
| $R_y$ | 216.743mm | −360.493mm |
| $R_z(0)$ | 130.000mm | −33.280mm |
| K | 0 | 0 |
| $A_1$ | 0 | 0 |
| $A_2$ | 0 | 0 |
| $A_3$ | 0 | 0 |
| $A_4$ | $-4.832074 \times 10^{-7}$ | $-1.774706 \times 10^{-7}$ |
| $A_5$ | 0 | 0 |
| $A_6$ | $-1.990969 \times 10^{-10}$ | $-1.725881 \times 10^{-10}$ |
| $A_7$ | 0 | 0 |
| $A_8$ | $2.406272 \times 10^{-13}$ | $8.912606 \times 10^{-14}$ |
| $A_9$ | 0 | 0 |
| $A_{10}$ | $-9.646743 \times 10^{-17}$ | $-1.539569 \times 10^{-17}$ |
| $A_{11}$ | 0 | 0 |
| $A_{12}$ | $1.805787 \times 10^{-20}$ | $-8.226578 \times 10^{-23}$ |
| $A_{13}$ | 0 | 0 |
| $A_{14}$ | $-1.318898 \times 10^{-24}$ | $1.580321 \times 10^{-25}$ |
| $B_1$ | $-2.648667 \times 10^{-5}$ | $-2.301939 \times 10^{-5}$ |
| $B_2$ | $4.844476 \times 10^{-6}$ | $6.734473 \times 10^{-6}$ |
| $B_3$ | $-1.666862 \times 10^{-8}$ | $-8.434161 \times 10^{-9}$ |
| $B_4$ | $-9.618063 \times 10^{-10}$ | $-7.599694 \times 10^{-10}$ |
| $B_5$ | $1.128043 \times 10^{-12}$ | $-3.190867 \times 10^{-12}$ |
| $B_6$ | $2.255894 \times 10^{-13}$ | $9.771973 \times 10^{-14}$ |
| $B_7$ | $-1.305794 \times 10^{-16}$ | $-5.458727 \times 10^{-16}$ |
| $B_8$ | $3.678314 \times 10^{-17}$ | $5.757923 \times 10^{-17}$ |

FIG. 52

(Type 3)

| | INCIDENT SURFACE | EMISSION SURFACE |
|---|---|---|
| $R_y$ | 216.743mm | −360.493mm |
| $R_z(0)$ | 130.000mm | −33.280mm |
| K | 0 | 0 |
| $A_1$ | 0 | 0 |
| $A_2$ | 0 | 0 |
| $A_3$ | 0 | 0 |
| $A_4$ | $-4.832074 \times 10^{-7}$ | $-1.774706 \times 10^{-7}$ |
| $A_5$ | 0 | 0 |
| $A_6$ | $-1.990969 \times 10^{-10}$ | $-1.725881 \times 10^{-10}$ |
| $A_7$ | 0 | 0 |
| $A_8$ | $2.406272 \times 10^{-13}$ | $8.912606 \times 10^{-14}$ |
| $A_9$ | 0 | 0 |
| $A_{10}$ | $-9.646743 \times 10^{-17}$ | $-1.539569 \times 10^{-17}$ |
| $A_{11}$ | 0 | 0 |
| $A_{12}$ | $1.805787 \times 10^{-20}$ | $-8.226578 \times 10^{-23}$ |
| $A_{13}$ | 0 | 0 |
| $A_{14}$ | $-1.318898 \times 10^{-24}$ | $1.580321 \times 10^{-25}$ |
| $B_1$ | $-8.652818 \times 10^{-6}$ | $-1.244543 \times 10^{-5}$ |
| $B_2$ | $5.262255 \times 10^{-6}$ | $6.954855 \times 10^{-6}$ |
| $B_3$ | $-1.639609 \times 10^{-8}$ | $-5.610248 \times 10^{-9}$ |
| $B_4$ | $-7.990896 \times 10^{-10}$ | $-6.748725 \times 10^{-10}$ |
| $B_5$ | $1.334999 \times 10^{-12}$ | $-3.493173 \times 10^{-12}$ |
| $B_6$ | $2.363613 \times 10^{-13}$ | $1.387407 \times 10^{-13}$ |
| $B_7$ | $1.433697 \times 10^{-16}$ | $3.720499 \times 10^{-16}$ |
| $B_8$ | $2.968136 \times 10^{-17}$ | $5.597119 \times 10^{-17}$ |

OPTICAL SCANNING DEVICE AND IMAGE FORMING APPARATUS

CROSS-REFERENCE TO RELATED APPLICATION

This patent application is based on and claims priority pursuant to 35 U.S.C. §119 to Japanese Patent Application No. 2011-207540, filed on Sep. 22, 2011, in the Japan Patent Office, the entire disclosure of which is hereby incorporated by reference herein.

BACKGROUND OF THE INVENTION

1. Field of the Invention

The present invention relates to an optical scanning device and an image forming apparatus, more specifically to an optical scanning device which scans scan target surfaces with light and an image forming apparatus including the optical scanning device.

2. Description of the Related Art

In the field of electrophotographic image recording, an image forming apparatus using a laser is widely used. The image forming apparatus includes, for example, a photosensitive drum (hereinafter also referred to as the photoconductor drum) and an optical scanning device which forms a latent image on an outer circumferential surface of the photoconductor drum. The optical scanning device includes, for example, a light source which emits laser light, an optical deflector, such as a polygon mirror, for example, which deflects the laser light emitted from the light source, and a scanning optical system which detects the laser light deflected by the optical deflector onto the outer circumferential surface of the photoconductor drum.

In recent years, along with the colorization of images and the increase in processing speed of image forming apparatuses, a tandem-type image forming apparatus including a plurality of photoconductor drums (normally four) has been increasingly used.

The tandem-type image forming apparatus tends to be increased in size in accordance with the increase in the number of photoconductor drums. Therefore, there is a demand for a reduction in device size, including a reduction in size of the optical scanning device. To reduce the size of the optical scanning device, it is effective to cause optical paths of a plurality of laser lights directed from the optical deflector toward the respective photoconductor drums to overlap one another.

For example, according to a background optical scanning device, a first light beam and a second light beam perpendicular to each other in polarization direction are deflected by a deflector and guided to and imaged on respective scan target surfaces via a scanning optical system. In the background optical scanning device, the scanning optical system includes a first scanning lens, a second scanning lens, and a polarization separation element. The first scanning lens is made of glass and disposed on the optical paths of the light beams deflected by the deflector. The second scanning lens is made of resin and disposed on the optical paths of the light beams transmitted through the first scanning lens. The polarization separation element is disposed on the optical paths of the light beams transmitted through the second scanning lens. The polarization separation element transmits therethrough the first light beam, and reflects the second light beam.

It is assumed in the background optical scanning device that the respective polarization directions of the two light beams incident on the polarization separation element are perpendicular to each other. The perpendicular relationship between the polarization directions of the two light beams, however, may fail to be maintained before the light beams are incident on the polarization separation element owing to such factors as installation error of a light source and birefringence occurring in the scanning lens molded of resin.

In this case, the polarization separation element, which is intended to completely reflect one of the light beams, instead transmits therethrough a portion of the light beam. As a result, the transmitted portion of the light beam reaches, as a ghost light, a scan target surface which is not intended to be reached by the light beam. At the same time, the polarization separation element, which is intended to completely transmit therethrough the other one of the light beams, instead reflects a portion of the light beam. As a result, the reflected portion of the light beam reaches, as a ghost light, a scan target surface which is not intended to be reached by the light beam. These ghost lights degrade the quality of the image output from the image forming apparatus.

According to the background optical scanning device, it is difficult to remove the ghost lights.

SUMMARY OF THE INVENTION

The present invention describes a novel optical scanning device. In one example, a novel optical scanning device separately scans a plurality of scan target surfaces in a first direction with light, and includes a light source device, an optical deflector, a scanning lens, and a branching optical element. The light source device is configured to emit a first light beam and a second light beam corresponding to two different scan target surfaces of the plurality of scan target surfaces. The optical deflector includes a reflection surface on which the first light beam and the second light beam emitted from the light source device are obliquely incident while being separated from each other in a second direction perpendicular to the first direction. Further, the optical deflector is configured to deflect the first light beam and the second light beam. The scanning lens is disposed on respective optical paths of the first light beam and the second light beam deflected by the optical deflector. The branching optical element is configured to transmit therethrough a major portion of the first light beam transmitted through the scanning lens, and reflect a major portion of the second light beam transmitted through the scanning lens. When the first light beam and the second light beam deflected by the optical deflector are projected on a plane perpendicular to the first direction, the first light beam and the second light beam intersect between the optical deflector and the branching optical element.

The scanning lens may include an incident surface having an effective scanning area and an emission surface. When the first light beam and the second light beam traveling toward the center in the first direction of the effective scanning area in the incident surface of the scanning lens are projected on the plane, the first light beam and the second light beam may intersect between the optical deflector and the incident surface of the scanning lens.

The scanning lens may include an incident surface having an effective scanning area and an emission surface. When the first light beam and the second light beam incident on the center in the first direction of the effective scanning area in the incident surface of the scanning lens are projected on the plane, the first light beam and the second light beam may intersect between the emission surface of the scanning lens and the branching optical element.

The scanning lens may include an incident surface having an effective scanning area and an emission surface. When the first light beam and the second light beam incident on the center in the first direction of the effective scanning area in the incident surface of the scanning lens are projected on the plane, the first light beam and the second light beam may intersect between the incident surface and the emission surface of the scanning lens.

The first light beam and the second light beam incident on the center in the first direction of the effective scanning area in the incident surface of the scanning lens may intersect a generatrix of the scanning lens and are emitted from the emission surface of the scanning lens.

The above-described optical scanning device may further include a line image forming element provided between the light source device and the optical deflector shared by the first light beam and the second light beam, and configured to form respective line images of the first light beam and the second light beam on the reflection surface of the optical deflector.

The first light beam and the second light beam emitted from the light source device may travel toward the line image forming element, while an interval between the first light beam and the second light beam is increased in the second direction. The first light beam and the second light beam emitted from the line image forming element may travel toward the optical deflector, while the interval between the first light beam and the second light beam is reduced in the second direction.

The above-described optical scanning device may further include an optical member provided on and configured to change at least one of the optical path of the first light beam transmitted through the branching optical element and the optical path of the second light beam reflected by the branching optical element. The optical member may include an incident surface and an emission surface which are non-power surfaces not parallel to each other, and at least one of which is a tilt-decentered surface. The amount of deviation from parallelism of the incident surface and the emission surface may change in accordance with the position of the optical member in the first direction.

The above-described optical scanning device may further include an optical housing including a first emission window configured to transmit therethrough the first light beam transmitted through the branching optical element, and a second emission window configured to transmit therethrough the second light beam reflected by the branching optical element.

The present invention further describes a novel image forming apparatus. In one example, a novel image forming apparatus includes a plurality of image carriers each configured to carry an image, and the above-described optical scanning device configured to scan the plurality of image carriers with light beams modulated in accordance with image data.

BRIEF DESCRIPTION OF THE DRAWINGS

A more complete appreciation of the invention and many of the advantages thereof are obtained as the same becomes better understood by reference to the following detailed description when considered in connection with the accompanying drawings, wherein:

FIG. 16 is a diagram illustrating an example of the shape of the scanning lenses;

FIG. 24 is a diagram illustrating the shape of the scanning lens in the case of FIG. 23;

FIG. 26 is a diagram illustrating the shape of the scanning lens in the case of FIG. 25;

FIG. 28 is a diagram illustrating the shape of the scanning lens in the case of FIG. 27;

FIG. 30 is a diagram illustrating the shape of the scanning lens in FIG. 29A;

FIG. 31 is a diagram illustrating the shape of the scanning lens in FIG. 29B;

FIG. 39 is a diagram illustrating a configuration including cylindrical lenses individually provided for two light beams;

FIG. 48 is a diagram illustrating the shape of the scanning lens in the second type of optical system;

FIG. 52 is a diagram illustrating the shape of the scanning lens in the third type of optical system;

DETAILED DESCRIPTION OF THE INVENTION

Figure 1:
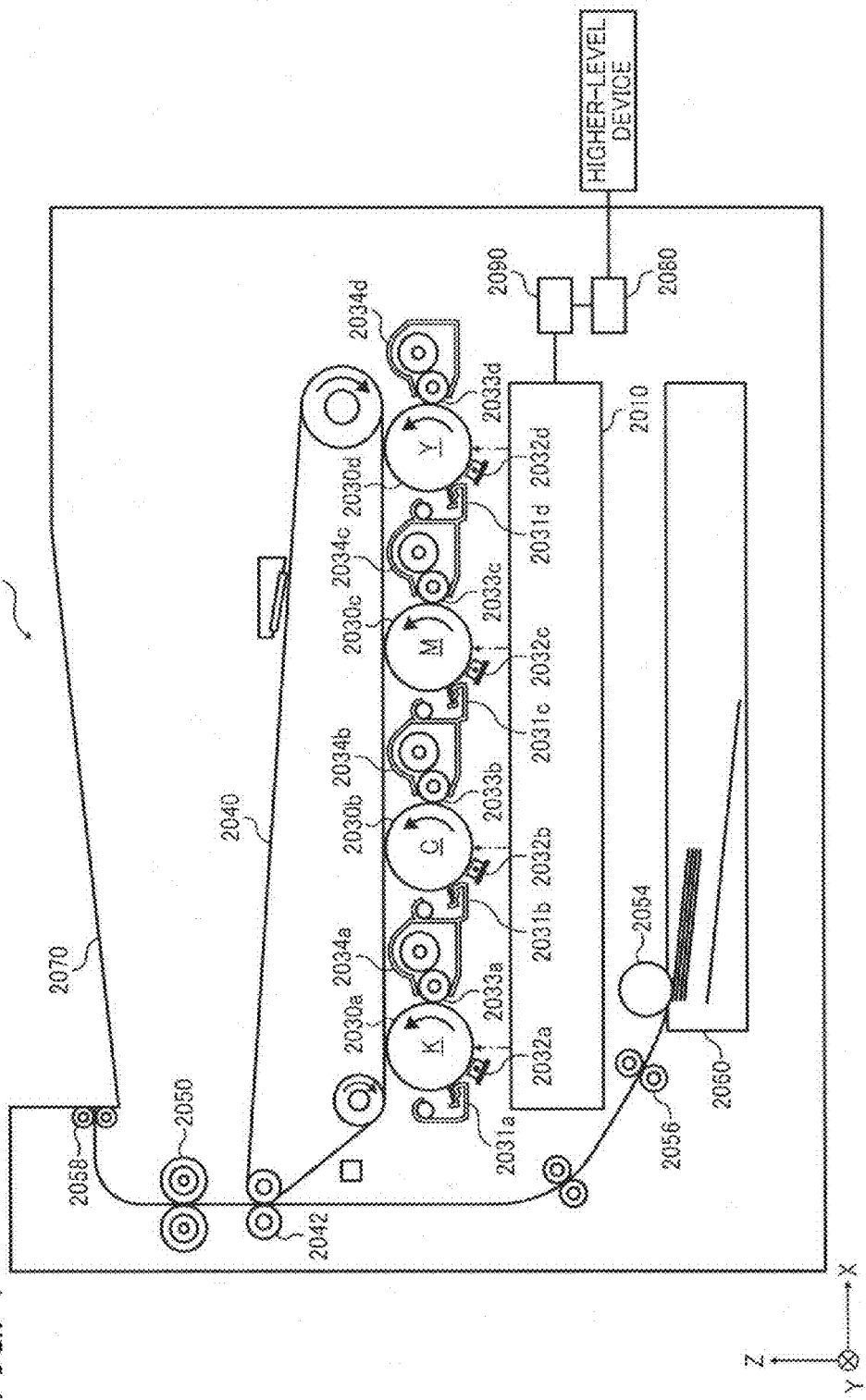
FIG. 1 is a diagram illustrating a schematic configuration of a color printer according to an embodiment of the present invention.

In describing the embodiments illustrated in the drawings, specific terminology is adopted for the purpose of clarity. However, the disclosure of the present invention is not intended to be limited to the specific terminology so used, and it is to be understood that substitutions for each specific element can include any technical equivalents that operate in a similar manner and achieve a similar result.

Referring now to the drawings, wherein like reference numerals designate identical or corresponding parts throughout the several views, an embodiment of the present invention will be described. FIG. 1 illustrates a schematic configuration of a color printer 2000 according to an embodiment of the present invention.

The color printer 2000 is a tandem-type multicolor printer which forms a full-color image by superimposing images in the four colors of black, cyan, magenta, and yellow. The color printer 2000 includes, for example, an optical scanning device 2010, four photoconductor drums 2030a, 2030b, 2030c, and 2030d, four cleaning units 2031a, 2031b, 2031c, and 2031d, four charging devices 2032a, 2032b, 2032c, and 2032d, four development rollers 2033a, 2033b, 2033c, and 2033d, four toner cartridges 2034a, 2034b, 2034c, and 2034d, a transfer belt 2040, a transfer roller 2042, a fixing roller pair 2050, a sheet feeding roller 2054, a feed roller pair 2056, a sheet discharging roller pair 2058, a sheet feeding tray 2060, a sheet discharging tray 2070, a communication control device 2080, and a printer control device 2090 that controls all of the above-described devices.

The communication control device 2080 controls bidirectional communication between the color printer 2000 and a higher-level device, such as a personal computer, for example, via a network or the like.

The printer control device 2090 includes, for example, a central processing unit (CPU), a read-only memory (ROM) which stores a program described in code readable by the CPU and a variety of data used to execute the program, a random access memory (RAM) which serves as a working memory, and an analog-to-digital (AD) converter which converts analog data into digital data. Further, the printer control device 2090 controls each of the devices in accordance with a request from the higher-level device, and transmits to the optical scanning device 2010 multicolor image data received from the higher-level device.

The photoconductor drum 2030a, the charging device 2032a, the development roller 2033a, the toner cartridge 2034a, and the cleaning unit 2031a are used as one group, and form an image forming station for forming an image of the black color (hereinafter also referred to as the K station for convenience).

The photoconductor drum 2030b, the charging device 2032b, the development roller 2033b, the toner cartridge 2034b, and the cleaning unit 2031b are used as one group, and form an image forming station for forming an image of the cyan color (hereinafter also referred to as the C station for convenience).

The photoconductor drum 2030c, the charging device 2032c, the development roller 2033c, the toner cartridge 2034c, and the cleaning unit 2031c are used as one group, and form an image forming station for forming an image of the magenta color (hereinafter also referred to as the M station for convenience).

The photoconductor drum 2030d, the charging device 2032d, the development roller 2033d, the toner cartridge 2034d, and the cleaning unit 2031d are used as one group, and form an image forming station for forming an image of the yellow color (hereinafter also referred to as the Y station for convenience).

Each of the photoconductor drums 2030a to 2030d has an outer circumferential surface formed with a photosensitive layer. That is, the outer circumferential surface of each of the photoconductor drums 2030a to 2030d is a scan target surface. The outer circumferential surface of each of the photoconductor drums 2030a to 2030d is rotated in the direction of the corresponding arrow in FIG. 1 by a not-illustrated rotation mechanism.

In the following description, it is assumed that, in an XYZ three-dimensional orthogonal coordinate system, a Y-axis direction (i.e., +Y or −Y direction) is parallel to the longitudinal direction of the photoconductor drums 2030a to 2030d, i.e., parallel to the direction of the respective axes of rotation of the photoconductor drums 2030a to 2030d, an X-axis direction (i.e., +X or −X direction) is parallel to the horizontal direction; i.e., the direction of arrangement of the four photoconductor drums 2030a to 2030d, and a Z-axis direction (i.e., +Z or −Z direction) is parallel to the vertical direction. In FIG. 1, the +X direction corresponds to the rightward direction, and the +Z direction corresponds to the upward direction. Further, the +Y direction corresponds to the direction from the proximal side toward the distal side of the drawing. The −X direction, the −Y direction, and the −Z direction are opposite to the +X direction, the +Y direction, and the +Z direction, respectively. Further, throughout the drawings, a cross mark inside a white circle represents an arrow directed from the proximal side toward the distal side of the drawings, and a black dot inside a white circle represents an arrow directed from the distal side toward the proximal side of the drawings.

Each of the charging devices 2032a to 2032d uniformly charges the outer circumferential surface of the corresponding one of the photoconductor drums 2030a to 2030d.

With four light beams modulated for the respective colors on the basis of the image data of the four colors (i.e., black image data, cyan image data, magenta image data, and yellow image data) received from the printer control device 2090, the optical scanning device 2010 scans the charged outer circumferential surfaces of the photoconductor drums 2030a to 2030d. Thereby, latent images corresponding to the image data are formed on the outer circumferential surfaces of the photoconductor drums 2030a to 2030d. In accordance with the rotation of the photoconductor drums 2030a to 2030d, the formed latent images move toward the respective development rollers 2033a to 2033d. Details of the optical scanning device 2010 will be described later.

Each of the photoconductor drums 2030a to 2030d has a scanning area in which the image data is written. The scanning area is also called an image forming area or an effective image area.

In accordance with the rotation of each of the development rollers 2033a to 2033d, the toner stored in the corresponding one of the toner cartridges 2034a to 2034d is thinly and uniformly applied to the outer circumferential surface of the each of the development rollers 2033a to 2033d. Then, the toner on the outer circumferential surface of the each of the development rollers 2033a to 2033d comes into contact with the outer circumferential surface of the corresponding one of the photoconductor drums 2030a to 2030d, and is transferred and adheres to the light-irradiated portions of the outer circumferential surface. That is, each of the development rollers 2033a to 2033d causes the toner to adhere to the latent image formed on the outer circumferential surface of the corresponding one of the photoconductor drums 2030a to 2030d, and thereby develops the latent image into a visible image. Then, in accordance with the rotation of the photoconductor drums 2030a to 2030d, the respective images having the toners adhering thereto, i.e., toner images move toward the transfer belt 2040.

The respective toner images of the yellow, magenta, cyan, and black colors are sequentially transferred and superimposed onto the transfer belt 2040 with predetermined timing. Thereby, a color image is formed.

The sheet feeding tray 2060 stores recording sheets each serving as a recording medium. The sheet feeding roller 2054 is disposed near the sheet feeding tray 2060, and picks up the recording sheets one by one from the sheet feeding tray 2060. Each of the recording sheets is sent toward a gap between the transfer belt 2040 and the transfer roller 2042 with predetermined timing. Thereby, the color image on the transfer belt 2040 is transferred onto the recording sheet. The recording sheet having the color image transferred thereto is sent to the fixing roller pair 2050.

With the fixing roller pair 2050, heat and pressure are applied to the recording sheet, and thereby the toners are fixed on the recording sheet. The recording sheet having the toners fixed thereon is then sent to the sheet discharging tray 2070 via the sheet discharging roller pair 2058. The thus sent recording sheets are sequentially stacked on the sheet discharging tray 2070.

Each of the cleaning units 2031a to 2031d removes residual toner remaining on the outer circumferential surface of the corresponding one of the photoconductor drums 2030a to 2030d. After the removal of the residual toner, the outer circumferential surface of each of the photoconductor drums 2030a to 2030d returns to the position facing the corresponding one of the charging devices 2032a to 2032d.

Details of the optical scanning device 2010 will now be described. As illustrated in an example of FIG. 2, the optical scanning device 2010 includes two light source units LU1 and LU2, a beam splitter 2205, two cylindrical lenses 2204A and 2204B, two reflecting mirrors M1 and M2, a polygon mirror 2104, a scanning optical system A, a scanning optical system B, and a not-illustrated scanning control device. These optical members are installed at respective predetermined positions in an optical housing 2300 (not illustrated in FIG. 2; see FIG. 11).

Figure 11:
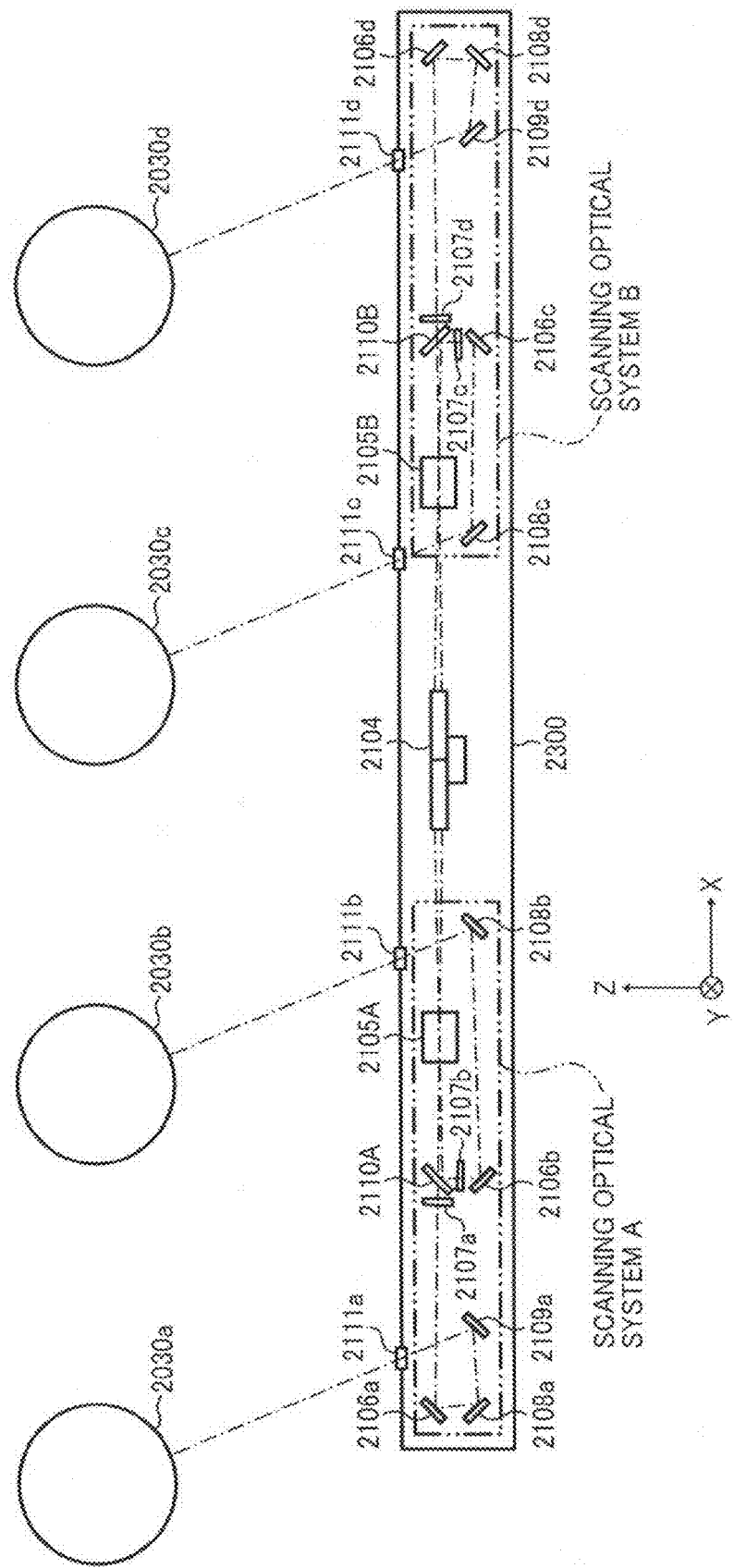
FIG. 11 is a diagram illustrating a first scanning optical system and a second scanning optical system in FIG. 2.

As illustrated in FIG. 11, the optical housing 2300 is provided with four slit-shaped emission windows 2111a, 2111b, 2111c, and 2111d through which the light beams are transmitted toward the respective photoconductor drums 2030a to 2030d. Each of the emission windows 2111a to 2111d is covered by a dust-proof glass.

In the following description of the optical members, a direction corresponding to the main scanning direction and a direction corresponding to the sub-scanning direction will be simply referred to as the main scanning corresponding direction and the sub-scanning corresponding direction, respectively, for convenience.

Figure 3:
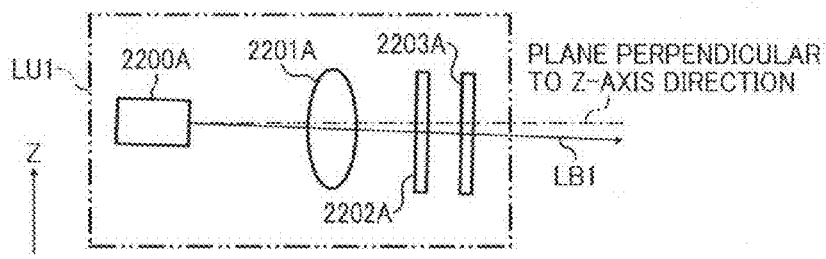
FIG. 3 is a diagram illustrating a first light source unit in FIG. 2.

As illustrated in an example of FIG. 3, the light source unit LU1 includes, for example, a light source 2200A, a coupling lens 2201A, a half-wave plate 2202A, and an aperture plate 2203A.

Figure 4:
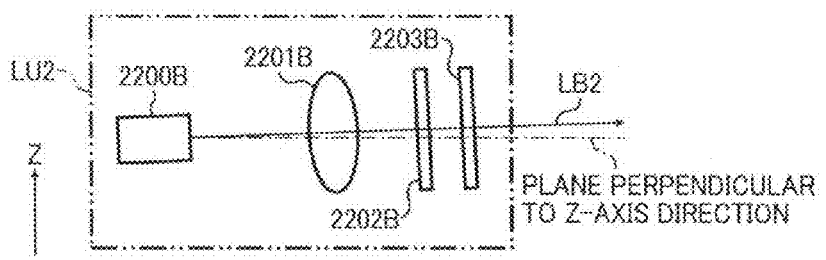
FIG. 4 is a diagram illustrating a second light source unit in FIG. 2.

As illustrated in an example of FIG. 4, the light source unit LU2 includes, for example, a light source 2200B, a coupling lens 2201B, a half-wave plate 2202B, and an aperture plate 2203B.

The lights emitted from the light sources 2200A and 2200B have the same wavelength (approximately 655 nm in the present embodiment). Further, each of the light sources 2200A and 2200B includes a drive circuit controlled by the not-illustrated scanning control device.

Each of the coupling lenses 2201A and 2201B converts the light beam emitted from the corresponding one of the light sources 2200A and 2200B into a substantially parallel light beam. The coupling lenses 2201A and 2201B have the same focal length (approximately 27 mm in the present embodiment).

The half-wave plate 2202A is disposed on the optical path of the light beam transmitted through the coupling lens 2201A, and converts the light beam into p-polarized light. In the present embodiment, the p-polarized light is a linearly polarized light having a polarization direction (i.e., a plane of vibration of an electric field vector) parallel to the Z-axis direction.

The aperture plate 2203A has an aperture to adjust the beam diameter of the light beam transmitted through the half-wave plate 2202A. The light beam transmitted through the aperture of the aperture plate 2203A is emitted from the light source unit LU1.

The half-wave plate 2202B is disposed on the optical path of the light beam transmitted through the coupling lens 2201B, and converts the light beam into s-polarized light. In the present embodiment, the s-polarized light is a linearly polarized light having a polarization direction (i.e., a plane of vibration of an electric field vector) perpendicular to the Z-axis direction.

The aperture plate 2203B has an aperture to adjust the beam diameter of the light beam transmitted through the half-wave plate 2202B. The light beam transmitted through the aperture of the aperture plate 2203B is emitted from the light source unit LU2.

In the following, the light beam emitted from the light source unit LU1 will be referred to as the light beam LB1, and the light beam emitted from the light source unit LU2 will be referred to as the light beam LB2. In the present embodiment, the light beam LB1 is the p-polarized light, and the light beam LB2 is the s-polarized light. That is, the light beams LB1 and LB2 respectively emitted from the light source units LU1 and LU2 are perpendicular to each other in polarization direction.

Further, as illustrated in FIG. 3, the light beam LB1 is emitted in a direction tilted clockwise relative to a plane including a light emitting portion of the light source 2200A and perpendicular to the Z-axis direction. Meanwhile, as illustrated in FIG. 4, the light beam LB2 is emitted in a direction tilted counterclockwise relative to a plane including a light emitting portion of the light source 2200B and perpendicular to the Z-axis direction.

Figure 5:
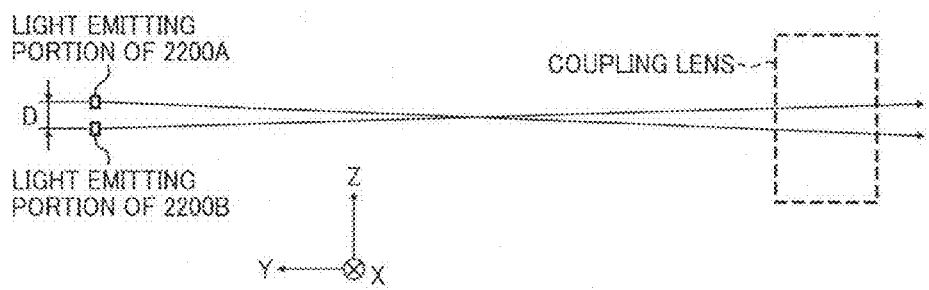
FIG. 5 is a diagram illustrating the positional relationship in the Z-axis direction between a light emitting portion of a light source in the first light source unit and a light emitting portion of a light source in the second light source unit.

Further, as illustrated in an example of FIG. 5, the light emitting portion of the light source 2200A and the light emitting portion of the light source 2200B are disposed to be separated from each other by a distance D in the Z-axis direction. Further, when viewed in the X-axis direction, the light beam LB1 emitted from the light source 2200A and the light beam LB2 emitted from the light source 2200B intersect, and then travel to the coupling lenses 2201A and 2201B, respectively. In the present embodiment, the distance D is approximately 0.12 mm.

Returning to FIG. 2, the beam splitter 2205 is disposed on the optical path of the light beam LB1 emitted from the light source unit LU1 and the optical path of the light beam LB2 emitted from the light source unit LU2.

The beam splitter 2205 includes a beam splitting surface which emits the incident p-polarized light and s-polarized light with a transmission rate and a reflection rate set to an equal value, and with the respective polarization states of the incident lights maintained. In the present embodiment, the beam splitting surface is a so-called half mirror surface.

Figure 6:
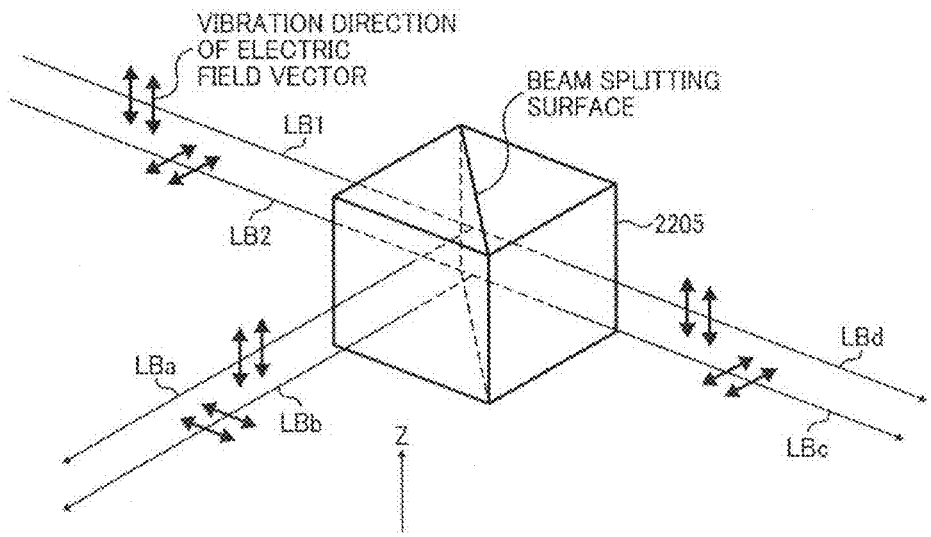
FIG. 6 is a diagram illustrating the operation of a beam splitter in FIG. 2.

Each of the light beams LB1 and LB2 is split into a reflected light and a transmitted light with equal light intensity by the beam splitter 2205. As illustrated in FIG. 6, the reflected light and the transmitted light of the light beam LB1 split by the beam splitter 2205 will be hereinafter referred to as the light beam LBa and the light beam LBd, respectively, and the reflected light and the transmitted light of the light beam LB2 split by the beam splitter 2205 will be hereinafter referred to as the light beam LBb and the light beam LBc, respectively. The light beams LBa and LBd are the p-polarized light, and the light beams LBb and LBc are the s-polarized light.

The cylindrical lens 2204A is disposed on the respective optical paths of the light beams LBa and LBb emitted from the beam splitter 2205, and images, via the reflecting mirror M1, the light beams LBa and LBb in the Z-axis direction near a deflective reflection surface of the polygon mirror 2104. That is, the cylindrical lens 2204A forms respective line images of the light beams LBa and LBb on the deflective reflection surface of the polygon mirror 2104.

Figure 7:
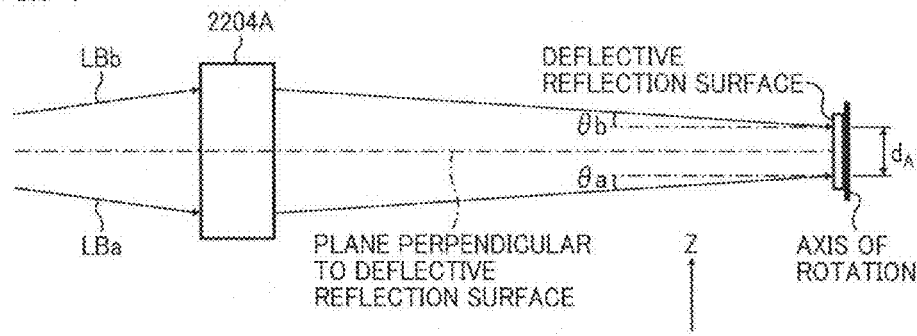
FIG. 7 is a diagram illustrating respective optical paths of two light beams incident on a first cylindrical lens in FIG. 2 and respective optical paths of two light beams emitted from the first cylindrical lens.

As illustrated in an example of FIG. 7, the light beams LBa and LBb travel toward the cylindrical lens 2204A, while an interval in the Z-axis direction between the light beams LBa and LBb is increased. Then, in the cylindrical lens 2204A, the light beam LBa is incident on a position on the −Z direction side of the center of the cylindrical lens 2204A, and the light beam LBb is incident on a position on the +Z direction side of the center of the cylindrical lens 2204A. During the transmission of the light beams LBa and LBb through the cylindrical lens 2204A, the respective optical paths of the light beams LBa and LBb are bent in the Z-axis direction. Thereby, the light beams LBa and LBb travel toward the deflective reflection surface of the polygon mirror 2104, while the interval in the Z-axis direction between the light beams LBa and LBb is reduced.

Then, the light beams LBa and LBb transmitted through the cylindrical lens 2204A are incident, in respective directions tilted relative to a plane perpendicular to the deflective reflection surface of the polygon mirror 2104, on respective positions in the deflective reflection surface separated from each other in the Z-axis direction.

As illustrated in FIG. 7, in the present embodiment, a distance $d_A$ in the Z-axis direction between the incidence position of the light beam LBa and the incidence position of the light beam LBb in the deflective reflection surface is approximately 2.04 mm.

The cylindrical lens 2204B is disposed on the respective optical paths of the light beams LBc and LBd, and images, via the reflecting mirror M2, the light beams LBc and LBd in the Z-axis direction near the deflective reflection surface of the polygon mirror 2104. That is, the cylindrical lens 2204B forms respective line images of the light beams LBc and LBd on the deflective reflection surface of the polygon mirror 2104.

Figure 8:
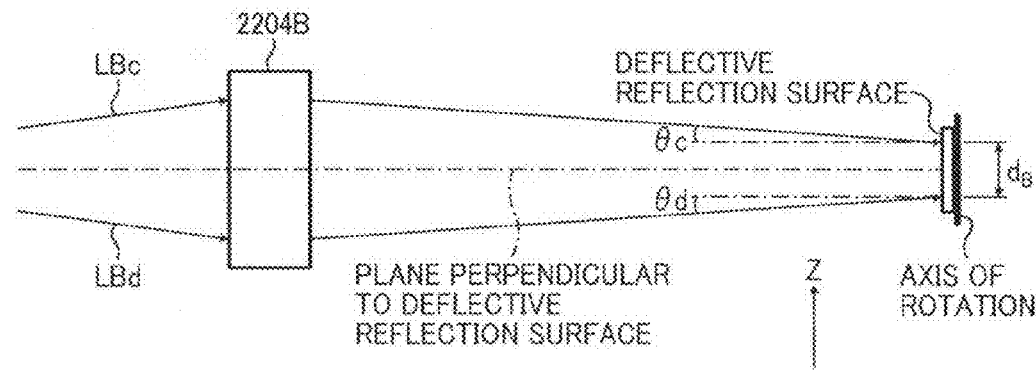
FIG. 8 is a diagram illustrating respective optical paths of two light beams incident on a second cylindrical lens in FIG. 2 and respective optical paths of two light beams emitted from the second cylindrical lens.

As illustrated in an example of FIG. 8, the light beams LBc and LBd travel toward the cylindrical lens 2204B, while an interval in the Z-axis direction between the light beams LBc and LBd is increased. Then, in the cylindrical lens 2204B, the light beam LBd is incident on a position on the −Z direction side of the center of the cylindrical lens 2204B, and the light beam LBc is incident on a position on the +Z direction side of the center of the cylindrical lens 2204B. During the transmission of the light beams LBc and LBd through the cylindrical lens 2204B, the respective optical paths of the light beams LBc and LBd are bent in the Z-axis direction. Then, the light beams LBc and LBd travel toward the deflective reflection surface of the polygon minor 2104, while the interval in the Z-axis direction between the light beams LBc and LBd is reduced.

Then, the light beams LBc and LBd transmitted through the cylindrical lens 2204B are incident, in respective directions tilted relative to the plane perpendicular to the deflective reflection surface of the polygon mirror 2104, on respective positions in the deflective reflection surface separated from each other in the Z-axis direction.

As illustrated in FIG. 8, in the present embodiment, a distance $d_B$ in the Z-axis direction between the incidence position of the light beam LBc and the incidence position of the light beam LBd in the deflective reflection surface is approximately 2.04 mm.

When a light is incident on the deflective reflection surface in a direction tilted relative to the plane perpendicular to the deflective reflection surface, the incidence will be hereinafter referred to as the oblique incidence, and the angle of the tilt will be hereinafter referred to as the oblique incidence angle. Meanwhile, when a light is incident on the deflective reflection surface in a direction parallel to the plane perpendicular to the deflective reflection surface, the incidence will be hereinafter referred to as the horizontal incidence. Further, an optical system corresponding to the oblique incidence will be hereinafter referred to as the oblique incidence optical system, and an optical system corresponding to the horizontal incidence will be hereinafter referred to as the horizontal incidence optical system.

In the present embodiment, the light beam LBa has an oblique incidence angle $\theta_a$ of approximately −0.9 degrees, and the light beam LBb has an oblique incidence angle $\theta_b$ of approximately 0.9 degrees. Further, the light beam LBc has an oblique incidence angle $\theta_c$ of approximately 0.9 degrees, and the light beam LBd has an oblique incidence angle $\theta_d$ of approximately −0.9 degrees.

The cylindrical lenses 2204A and 2204B have the same focal length (approximately 58 mm in the present embodiment). The optical system disposed between each of the light sources 2200A and 2200B and the polygon mirror 2104 is also called a pre-deflector optical system.

The polygon mirror 2104 includes four mirror facets each serving as the deflective reflection surface. The polygon mirror 2104 rotates at a constant velocity around an axis parallel to the Z-axis direction, and causes the light beams LBa and LBb emitted from the cylindrical lens 2204A and the light beams LBc and LBd emitted from the cylindrical lens 2204B to be deflected at a constant angular velocity. An inscribed circle inside the four mirror facets has a radius of approximately 8 mm.

The light beams LBa and LBb are incident on a facet of the deflective reflection surface located on the −X direction side of the axis of rotation of the polygon mirror 2104. Meanwhile, the light beams LBc and LBd are incident on a facet of the deflective reflection surface located on the +X direction side of the axis of rotation of the polygon mirror 2104.

Figure 2:
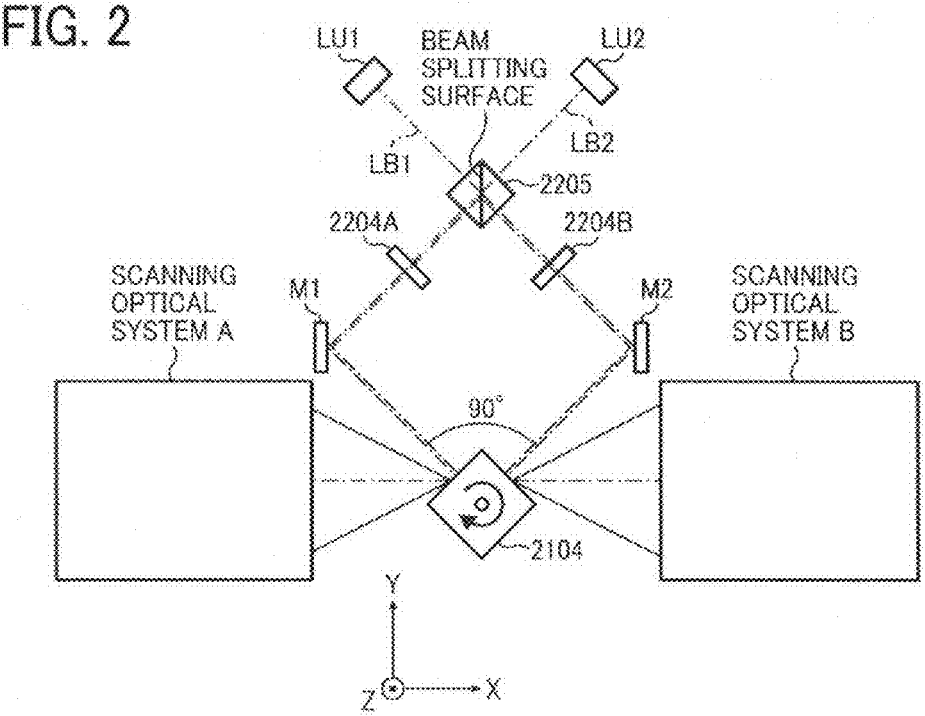
FIG. 2 is a diagram illustrating an optical scanning device in FIG. 1.

As illustrated in FIG. 2, when viewed in the Z-axis direction, the angle formed between the light beams LBa and LBb and the light beams LBc and LBd incident on the polygon mirror 2104 is approximately 90 degrees. Therefore, the light beams LBa and LBd do not simultaneously scan the respective image forming areas of the corresponding photoconductor drums 2030a and 2030d. Similarly, the light beams LBb and LBc do not simultaneously scan the respective image forming areas of the corresponding photoconductor drums 2030b and 2030c.

Figure 9:
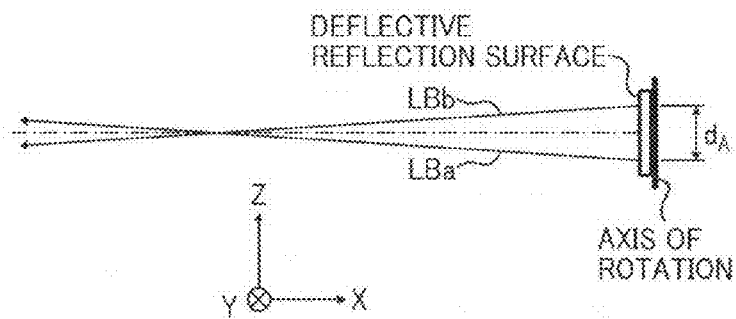
FIG. 9 is a diagram illustrating respective optical paths of two light beams deflected by a deflective reflection surface of a polygon mirror in FIG. 2.
Figure 10:
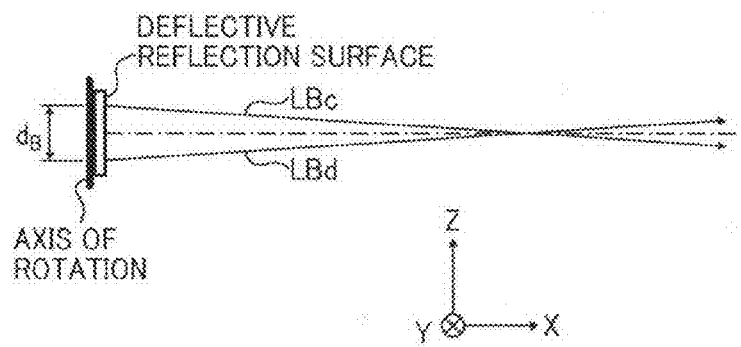
FIG. 10 is a diagram illustrating respective optical paths of another two light beams deflected by the deflective reflection surface of the polygon mirror.

As illustrated in FIGS. 9 and 10, each of the light beams LBa to LBd incident on the deflective reflection surface is reflected in a direction tilted relative to the plane perpendicular to the deflective reflection surface.

As illustrated in an example of FIG. 11, the scanning optical system A includes a scanning lens 2105A, a polarization separation element 2110A, two tilt-decentered lenses 2107a and 2107b, and five turning mirrors 2106a, 2106b, 2108a, 2108b, and 2109a.

Figure 12:
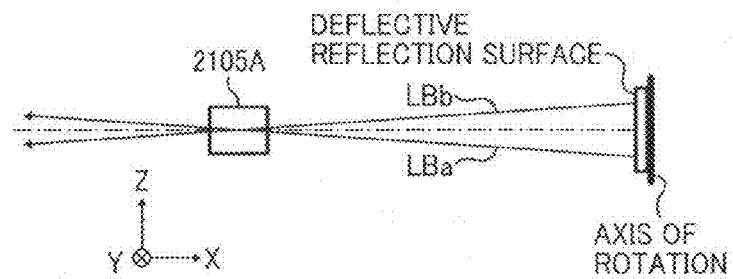
FIG. 12 is a diagram illustrating an arrangement position of a scanning lens in the first scanning optical system.
Figure 13:
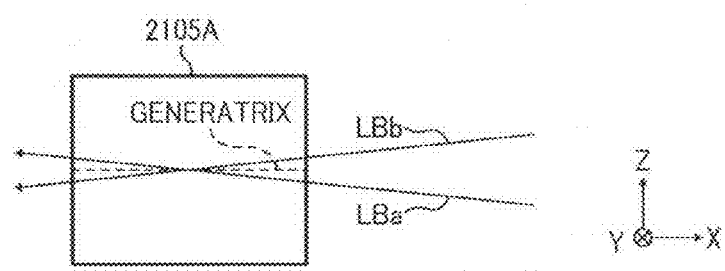
FIG. 13 is a partial enlarged view of FIG. 12.

As illustrated in FIG. 12, the scanning lens 2105A is located on the −X direction side of the polygon mirror 2104, and is disposed at a position at which the light beams LBa and LBb transmitted through the center in the Y-axis direction of an effective scanning area in an incident surface of the scanning lens 2105A intersect between the incident surface and an emission surface of the scanning lens 2105A. Further, as illustrated in FIG. 13, the light beams LBa and LBb transmitted through the center in the Y-axis direction of the effective scanning area in the incident surface of the scanning lens 2105A intersect the generatrix of the scanning lens 2105A, and are emitted from the scanning lens 2105A. Herein, the effective scanning area of a scanning lens refers to the area through which a light beam traveling to the image forming area of the corresponding photoconductor drum is transmitted.

The optical path length from the deflective reflection surface of the polygon mirror 2104 to the incident surface of the scanning lens 2105A is approximately 55.112 mm. Further, the thickness of a central portion of the scanning lens 2105A is approximately 21 mm. Further, the optical path length from the emission surface of the scanning lens 2105A to the outer circumferential surface of the photoconductor drum 2030a and the optical path length from the emission surface of the scanning lens 2105A to the outer circumferential surface of the photoconductor drum 2030b are both approximately 229 mm.

The polarization separation element 2110A is located on the −X direction side of the scanning lens 2105A, and is disposed on the respective optical paths of the light beams LBa and LBb transmitted through the scanning lens 2105A.

The polarization separation element 2110A serves as a polarization separation element which transmits therethrough p-polarized light traveling to the image forming area of the corresponding photoconductor drum, and reflects, in the −Z direction, s-polarized light traveling to the image forming area of the corresponding photoconductor drum. Such a polarization separation element includes, for example, a wire grid element as disclosed in Japanese Laid-Open Patent Application No. 2010-134411 (JP-2010-134411-A). With this configuration, a major portion of the light beam LBa is transmitted through the polarization separation element 2110A, and a major portion of the light beam LBb is reflected in the −Z direction by the polarization separation element 2110A.

The tilt-decentered lens 2107a is disposed on the optical path of the light beam LBa transmitted through the polarization separation element 2110A, and changes the optical path of the light beam LBa by using the prismatic effect. The optical path length from the emission surface of the scanning lens 2105A to an incident surface of the tilt-decentered lens 2107a is approximately 74 mm. Further, the thickness of a central portion of the tilt-decentered lens 2107a is approximately 3 mm.

The tilt-decentered lens 2107b is disposed on the optical path of the light beam LBb reflected by the polarization separation element 2110A, and changes the optical path of the light beam LBb by using the prismatic effect. The optical path length from the emission surface of the scanning lens 2105A to an incident surface of the tilt-decentered lens 2107b is approximately 74 mm. Further, the thickness of a central portion of the tilt-decentered lens 2107b is approximately 3 mm.

The light beam LBa transmitted through the tilt-decentered lens 2107a is guided to the outer circumferential surface of the photoconductor drum 2030a via the turning mirrors 2106a, 2108a, and 2109a and the emission window 2111a. The optical path length from an emission surface of the tilt-decentered lens 2107a to the outer circumferential surface of the photoconductor drum 2030a is approximately 152 mm.

The light beam LBb transmitted through the tilt-decentered lens 2107b is guided to the outer circumferential surface of the photoconductor drum 2030b via the turning mirrors 2106b and 2108b and the emission window 2111b. The optical path length from an emission surface of the tilt-decentered lens 2107b to the outer circumferential surface of the photoconductor drum 2030b is approximately 152 mm.

The scanning optical system B includes a scanning lens 2105B, a polarization separation element 2110B, two tilt-decentered lenses 2107c and 2107d, and five turning mirrors 2106c, 2106d, 2108c, 2108d, and 2109d.

Figure 14:
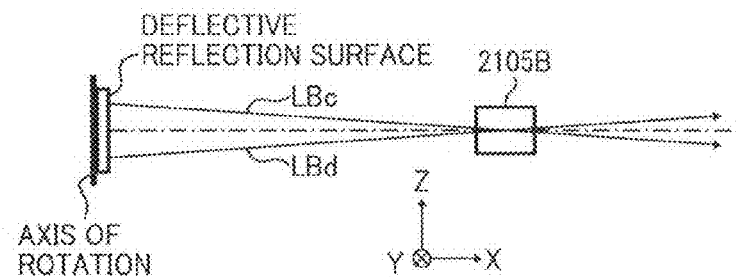
FIG. 14 is a diagram illustrating an arrangement position of a scanning lens in the second scanning optical system.
Figure 15:
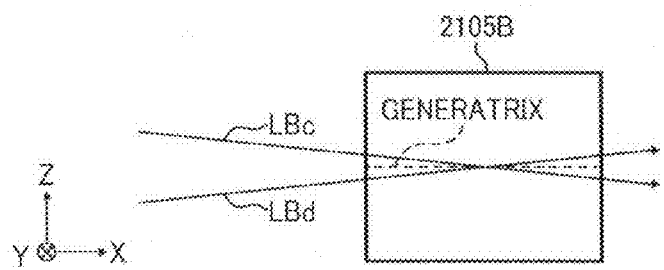
FIG. 15 is a partial enlarged view of FIG. 14.

As illustrated in FIG. 14, the scanning lens 2105B is located on the +X direction side of the polygon mirror 2104, and is disposed at a position at which the light beams LBc and LBd transmitted through the center in the Y-axis direction of an effective scanning area in an incident surface of the scanning lens 2105B intersect between the incident surface and an emission surface of the scanning lens 2105B. Further, as illustrated in FIG. 15, the light beams LBc and LBd transmitted through the center in the Y-axis direction of the effective scanning area in the incident surface of the scanning lens 2105B intersect the generatrix of the scanning lens 2105B, and are emitted from the scanning lens 2105B.

The optical path length from the deflective reflection surface of the polygon mirror 2104 to the incident surface of the scanning lens 2105B is approximately 55.112 mm. Further, the thickness of a central portion of the scanning lens 2105B is approximately 21 mm. Further, the optical path length from the emission surface of the scanning lens 2105B to the outer circumferential surface of the photoconductor drum 2030c and the optical path length from the emission surface of the scanning lens 2105B to the outer circumferential surface of the photoconductor drum 2030d are both approximately 229 mm.

The polarization separation element 2110B is located on the +X direction side of the scanning lens 2105B, and is disposed on the respective optical paths of the light beams LBc and LBd transmitted through the scanning lens 2105B.

The polarization separation element 2110B is equivalent to the above-described polarization separation element 2110A. Therefore, a major portion of the light beam LBd is transmitted through the polarization separation element 2110B, and a major portion of the light beam LBc is reflected in the −Z direction by the polarization separation element 2110B.

The tilt-decentered lens 2107c is disposed on the optical path of the light beam LBc reflected by the polarization separation element 2110B, and changes the optical path of the light beam LBc by using the prismatic effect. The optical path length from the emission surface of the scanning lens 2105B to an incident surface of the tilt-decentered lens 2107c is approximately 74 mm. Further, the thickness of a central portion of the tilt-decentered lens 2107c is approximately 3 mm.

The tilt-decentered lens 2107d is disposed on the optical path of the light beam LBd transmitted through the polarization separation element 2110B, and changes the optical path of the light beam LBd by using the prismatic effect. The optical path length from the emission surface of the scanning lens 2105B to an incident surface of the tilt-decentered lens 2107d is approximately 74 mm. Further, the thickness of a central portion of the tilt-decentered lens 2107d is approximately 3 mm.

The light beam LBc transmitted through the tilt-decentered lens 2107c is guided to the outer circumferential surface of the photoconductor drum 2030c via the turning mirrors 2106c and 2108c and the emission window 2111c. The optical path length from an emission surface of the tilt-decentered lens 2107c to the outer circumferential surface of the photoconductor drum 2030c is approximately 152 mm.

The light beam LBd transmitted through the tilt-decentered lens 2107d is guided to the outer circumferential surface of the photoconductor drum 2030d via the turning mirrors 2106d, 2108d, and 2109d and the emission window 2111d. The optical path length from an emission surface of the tilt-decentered lens 2107d to the outer circumferential surface of the photoconductor drum 2030d is approximately 152 mm.

In accordance with the rotation of the polygon mirror 2104, respective light spots on the outer circumferential surfaces of the photoconductor drums 2030a to 2030d move in the longitudinal direction of the photoconductor drums 2030a to 2030d. In this process, the moving direction of the light spots corresponds to the main scanning direction, and the rotation direction of the photoconductor drums 2030a to 2030d corresponds to the sub-scanning direction.

The scanning lens 2105A is shared by two of the image forming stations, and the scanning lens 2105B is shared by the remaining two of the image forming stations. A cross-section of each of optical surfaces of the scanning lenses 2105A and 2105B perpendicular to the Z-axis direction, i.e., a cross-section in the main scanning direction of the optical surface has a non-arc shape expressed by the following formula (1). Herein, x represents the depth in the X-axis direction, and y represents the distance in the Y-axis direction from the optical axis. Further, K represents a conic constant, and $A_1$, $A_2$, $A_3$, $A_4$, $A_5$, $A_6$, and so forth represent coefficients. Further, a relationship Cm=1/Ry holds, wherein Cm represents a paraxial curvature, and Ry represents a paraxial curvature radius.

$$x = \frac{y^2 \cdot Cm}{1 + \sqrt{1 - (1+K) \cdot (y \cdot Cm)^2}} + A_1 \cdot y + \\ A_2 \cdot y^2 + A_3 \cdot y^3 + A_4 \cdot y^4 + A_5 \cdot y^5 + A_6 \cdot y^6 + \ldots \tag{1}$$

Further, a cross-section of each of the optical surfaces of the scanning lenses 2105A and 2105B perpendicular to the Y-axis direction, i.e., a cross-section in the sub-scanning direction of the optical surface is expressed by the following formula (2).

$$C(y) = \frac{1}{Rz(0)} + B_1 \cdot y + B_2 \cdot y^2 + B_3 \cdot y^3 + B_4 \cdot y^4 + B_5 \cdot y^5 + B_6 \cdot y^6 + \ldots \tag{2}$$

In the above formula (2), Rz(0) represents a curvature radius on the optical axis in the cross-section in the sub-scanning direction, and $B_1$, $B_2$, $B_3$, $B_4$, $B_5$, $B_6$, and so forth represent coefficients.

FIG. 16 illustrates a specific example of the respective shapes of the incident surface and the emission surface of the scanning lenses 2105A and 2105B. In the present embodiment, the values of the odd-order coefficients of the distance y in the above formula (1), i.e., $A_1, A_3, A_5$, and so forth are all 0. This indicates that each of the incident surface and the emission surface has a shape symmetrical about the Y-axis direction. Further, the values of the odd-order coefficients of the distance y in the above formula (2), i.e., $B_1$, $B_3$, $B_5$, and so forth are not 0. This indicates that each of the incident surface and the emission surface has a shape in which the change in curvature in the Z-axis direction is asymmetrical about the Y-axis direction.

In each of the tilt-decentered lenses 2107a to 2107d, the cross-section in the main scanning direction of the emission optical surface is expressed by the following formula (3). In the formula, $D_1$, $D_2$, $D_3$, $D_4$, and so forth represent coefficients.

$$x = (D_0 + D_1 \cdot y + D_2 \cdot y_2 + D_3 \cdot y^3 + D_4 \cdot y^4 + \ldots) \cdot z \quad (3)$$

In the present embodiment, the coefficient $D_0$ is $2.848569 \times 10^{-2}$, the coefficient $D_1$ is 0, the coefficient $D_2$ is $-9.647127 \times 10^{-7}$, the coefficient $D_3$ is 0, the coefficient $D_4$ is $5.708654 \times 10^{-11}$, the coefficient $D_5$ is 0, the coefficient $D_6$ is $-1.207798 \times 10^{-15}$, the coefficient $D_7$ is 0, and the coefficient $D_8$ is $1.61425 \times 10^{-20}$.

If the values of the odd-order coefficients of the distance y in the above formula (3), i.e., $D_1$, $D_3$, and $D_5$, and so forth are not 0, the emission optical surface has a shape in which the change in curvature in the Z-axis direction is asymmetrical about the Y-axis direction.

Figure 17:
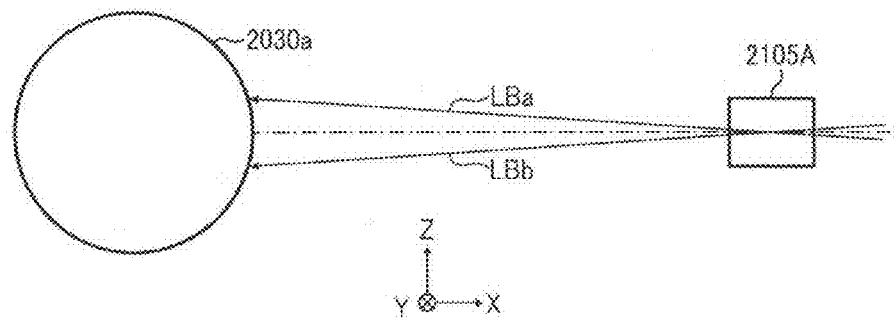
FIG. 17 is a diagram illustrating a ghost light.

FIG. 17 schematically illustrates the respective optical paths of the light beams LBa and LBb reflected by the deflective reflection surface of the polygon mirror 2104 on the assumption that the polarization separation element 2110A is absent. In this case, the light beams LBa and LBb reflected by the deflective reflection surface intersect at the arrangement position of the scanning lens 2105A, and thereafter travel to the photoconductor drum 2030a while diverging from each other.

This phenomenon is similar to a phenomenon occurring in a case where the polarization separation element 2110A is present, but the scanning lens 2105A is made of resin and thus causes birefringence affecting the light beams LBa and LBb reflected by the deflective reflection surface. In this case, the perpendicular relationship between the polarization state of the light beam LBa and of the polarization state of the light beam LBb is lost after the transmission of the light beams LBa and LBb through the scanning lens 2105A, and the polarization separation element 2110A fails to completely separate the light beams LBa and LBb from each other. That is, ghost lights are generated.

Figure 18:
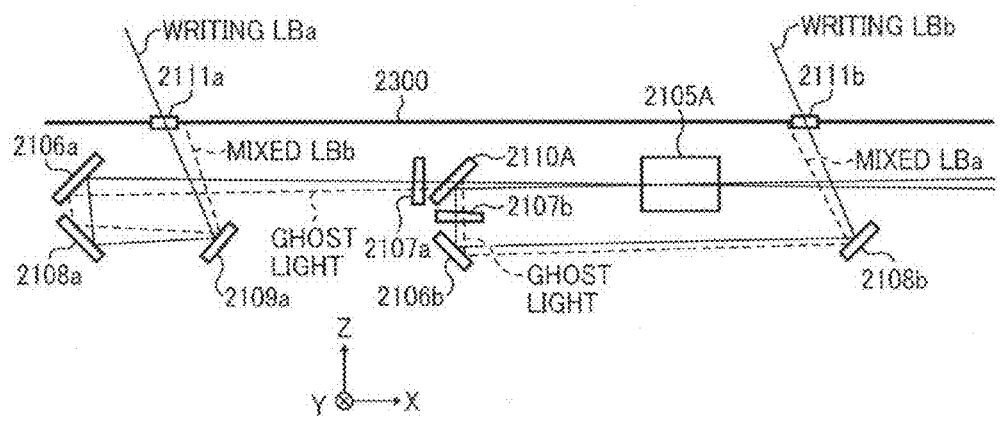
FIG. 18 is a diagram illustrating the removal of ghost lights.
Figure 19:
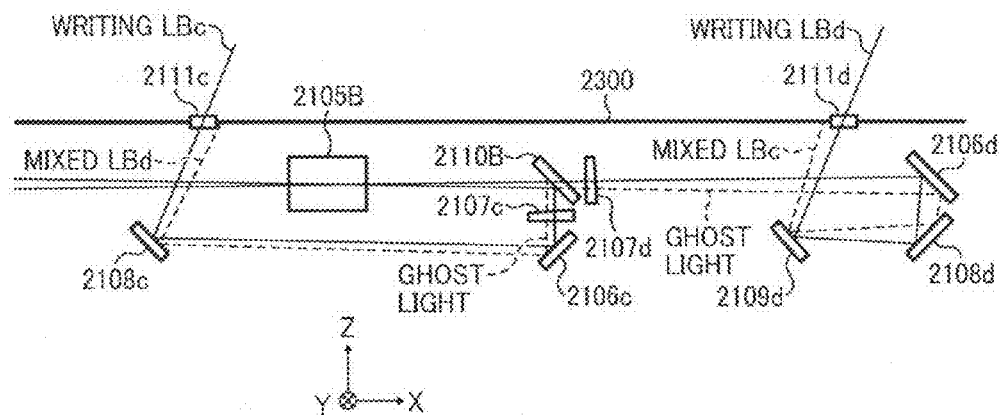
FIG. 19 is another diagram illustrating the removal of ghost lights.

In this case, the location most suitable for removing the ghost lights corresponds to a position which is behind the polarization separation element 2110A inside the optical scanning device 2010, and at which the two light beams LBa and LBb are sufficiently separated from each other. It is conceivable to provide a ghost light removing device outside the optical scanning device 2010. Such a configuration, however, requires the optical scanning device 2010 and the ghost light removing device to be aligned with substantially high accuracy, and thus is unrealistic. As illustrated in FIGS. 18 and 19, therefore, it is preferable to remove the ghost lights near the emission windows 2111a to 2111d of the optical housing 2300 for emitting the writing light beams LBa to LBd from the optical scanning device 2010. To allow such removal of the ghost lights, the respective reflection positions of the two light beams LBa and LBb on the deflective reflection surface are separated from each other in the Z-axis direction, and the respective reflection positions of the two light beams LBc and LBd on the deflective reflection surface are separated from each other in the Z-axis direction. Accordingly, the present embodiment is capable of removing the ghost lights in a configuration in which the respective optical paths of two light beams deflected by an optical deflector overlap each other.

Figure 20:
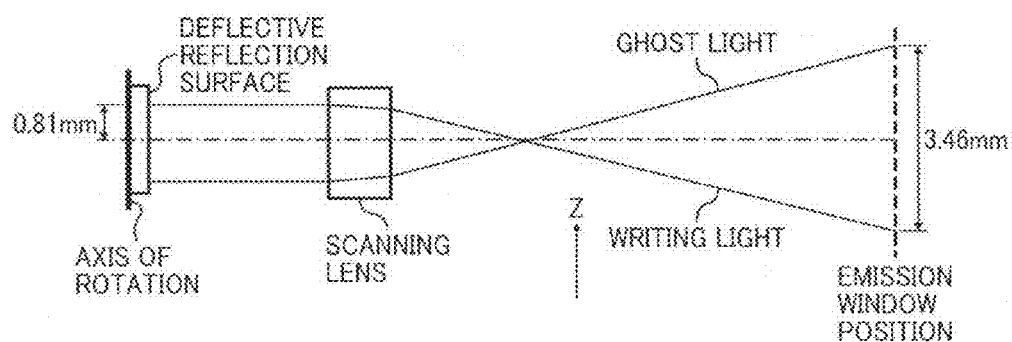
FIG. 20 is a diagram illustrating respective optical paths of two light beams transmitted through a scanning lens in horizontal incidence.
Figure 21:
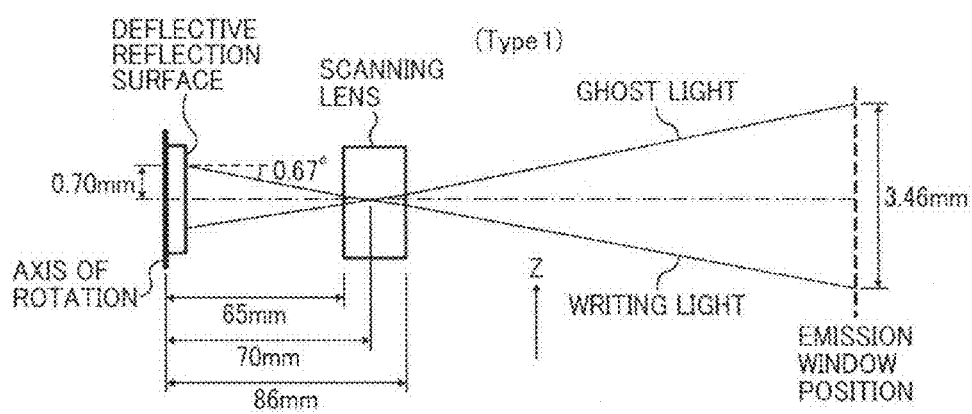
FIG. 21 is a diagram illustrating respective optical paths of two light beams transmitted through a scanning lens in oblique incidence.

An optical characteristic to be attained as well as the removal of ghost lights is the suppression of wavefront aberration. As illustrated in FIG. 20, if the horizontal incidence optical system is employed in the configuration in which the respective reflection positions of two light beams on the deflective reflection surface are separated from each other in the Z-axis direction to remove ghost lights, each of the light beams passes a position separated from the generatrix of the scanning lens, and thus the wavefront aberration is increased. Meanwhile, the oblique incidence optical system allows each of the light beams to pass a position near the generatrix of the scanning lens, as illustrated in FIG. 21, but wavefront aberration due to the oblique incidence is generated. For convenience, the optical system illustrated in FIG. 21 will be hereinafter referred to as the optical system of Type 1.

In the optical system of Type 1, the wavelength of each of the light beams emitted from the light sources is approximately 782 nm, and the optical path length from the deflective reflection surface of the polygon mirror to the incident surface of each of the scanning lenses is approximately 57.112 mm. Further, the optical path length from the emission surface of the scanning lens to the outer circumferential surface of the corresponding photoconductor drum is approximately 224 mm. For the purpose of clarity, the optical system of Type 1 is not provided with a tilt-decentered lens.

A description will now be given of the wavefront aberration occurring in the configuration in which two light beams are separated from each other in the Z-axis direction on the deflective reflection surface to remove ghost lights.

To compare the wavefront aberration between the horizontal incidence optical system and the oblique incidence optical system, a description will now be given of a horizontal incidence optical system and an oblique incidence optical system not provided with a tilt-decentered lens, in which the wavelength of each of the light beams is approximately 782 nm, the optical path length from the deflective reflection surface of the polygon mirror to the incident surface of each of the scanning lenses is approximately 57.112 mm, and the optical path length from the emission surface of the scanning lens to the outer circumferential surface of the corresponding photoconductor drum is approximately 224 mm The optical systems may be configured similarly as in the present embodiment provided with the above-described tilt-decentered lenses 2107a to 2107d. That is, the wavelength of each of the light beams may be set to approximately 655 nm, and the optical path length from the deflective reflection surface of the polygon mirror to the incident surface of each of the scanning lenses may be set to approximately 55.112 mm. Further, the optical path length from the emission surface of the scanning lens to the outer circumferential surface of the corresponding photoconductor drum may be set to approximately 229 mm.

Figure 22:
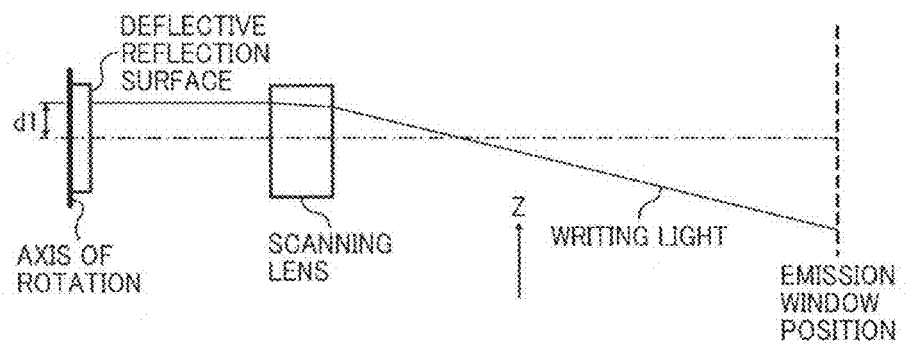
FIG. 22 is a diagram illustrating a distance in the Z-axis direction between a generatrix of a scanning lens and a passage position of a light beam transmitted through the scanning lens in horizontal incidence.

As illustrated in an example of FIG. 22, in the horizontal incidence optical system, if the respective reflection positions of two light beams on the deflective reflection surface are separated from each other in the Z-axis direction to remove ghost lights at the position of the emission windows (hereinafter referred to as the emission window position), each of the two light beams passes a position separated from the generatrix of the scanning lens. As a result, the wavefront aberration is increased.

Figure 23:
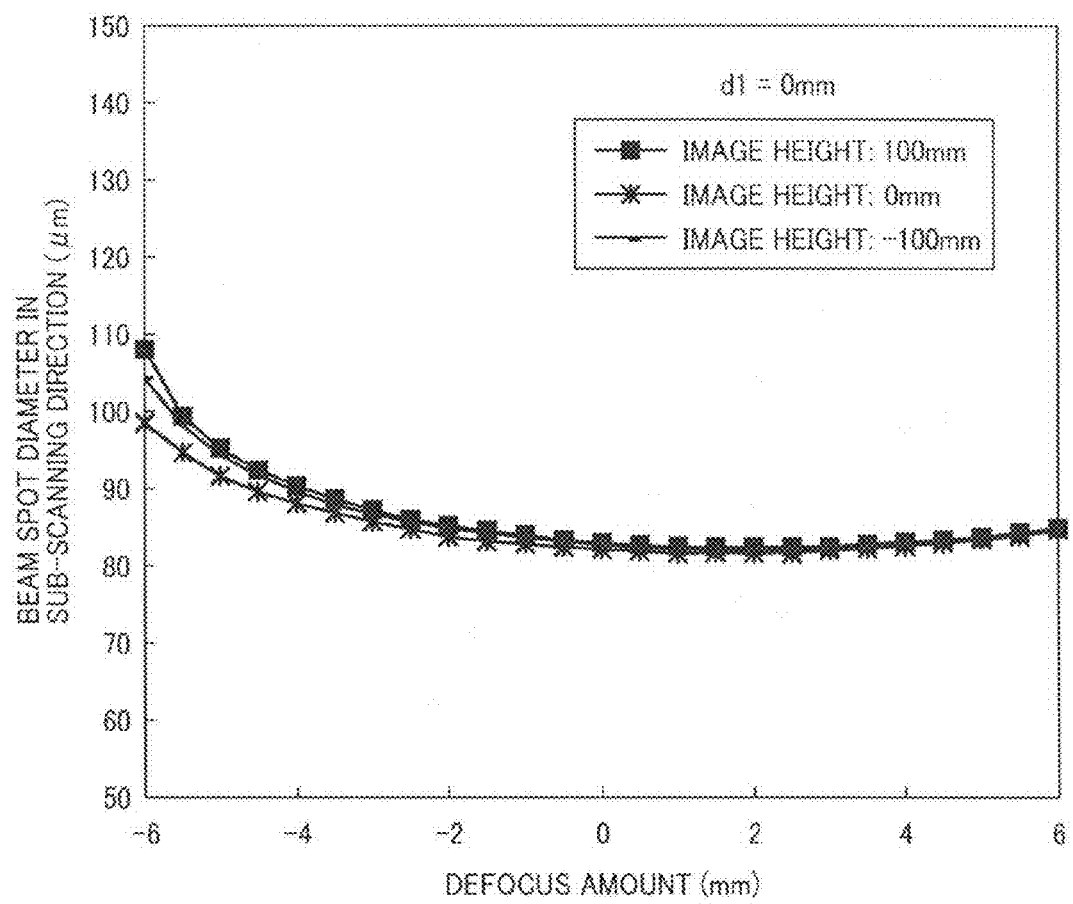
FIG. 23 is a diagram illustrating the relationship between a defocus amount and a beam spot diameter in a sub-scanning direction in horizontal incidence, wherein the distance in FIG. 22 is 0 mm.

FIG. 23 illustrates the relationship between the defocus amount and the beam spot diameter in the sub-scanning direction in a case where the light beam passes the position of the generatrix of the scanning lens in the horizontal incidence optical system. FIG. 24 illustrates the shape of the scanning lens in this case. The image height in FIG. 23 refers to the position in the main scanning direction expressed by coordinates relative to the center in the Y-axis direction of the image forming area of the photoconductor drum.

Figure 25:
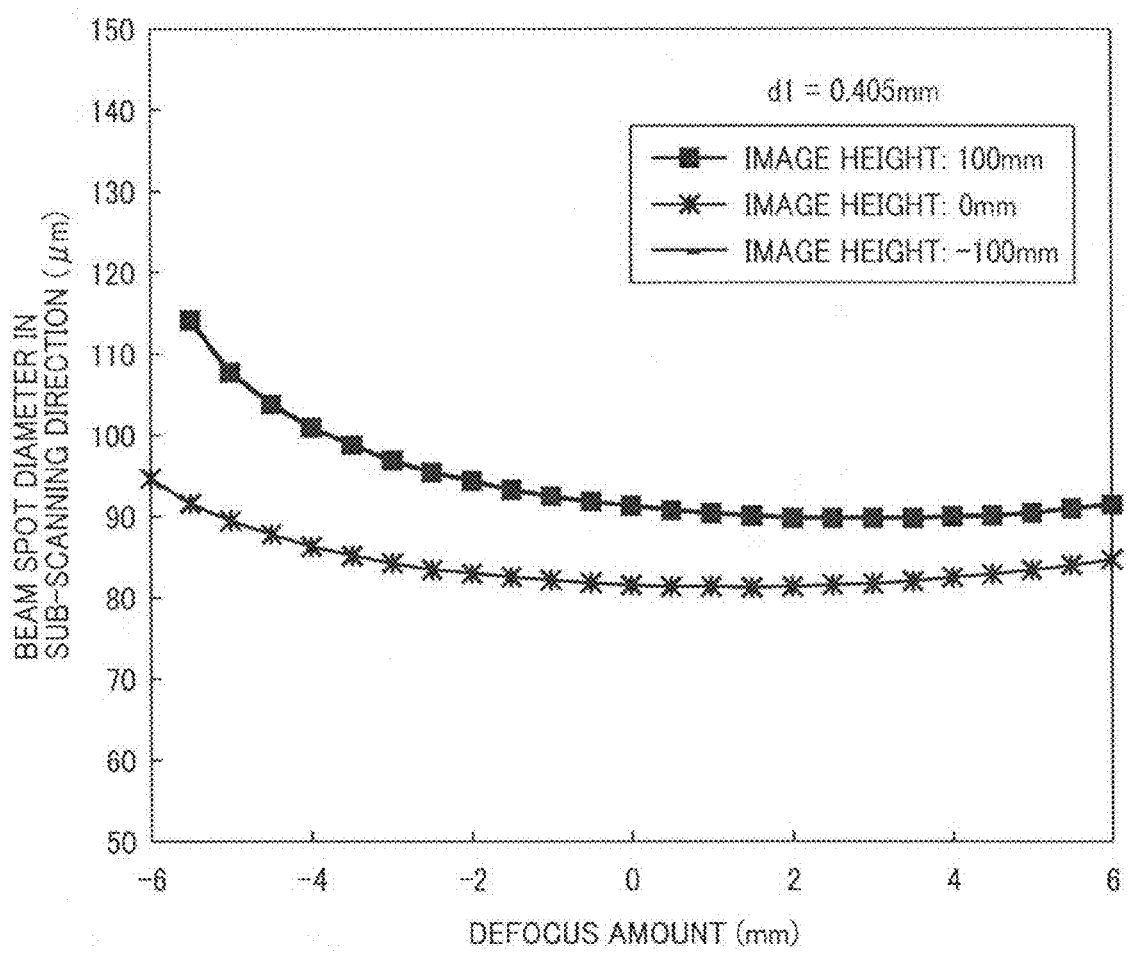
FIG. 25 is a diagram illustrating the relationship between the defocus amount and the beam spot diameter in the sub-scanning direction in horizontal incidence, wherein the distance in FIG. 22 is 0.405 mm.

FIG. 25 illustrates the relationship between the defocus amount and the beam spot diameter in the sub-scanning direction in a case where the light beam passes a position separated from the generatrix of the scanning lens by 0.405 mm in the horizontal incidence optical system. FIG. 26 illustrates the shape of the scanning lens in this case. In FIG. 25, the data of an image height of 100 mm and the data of an image height of −100 mm substantially overlap each other.

Figure 27:
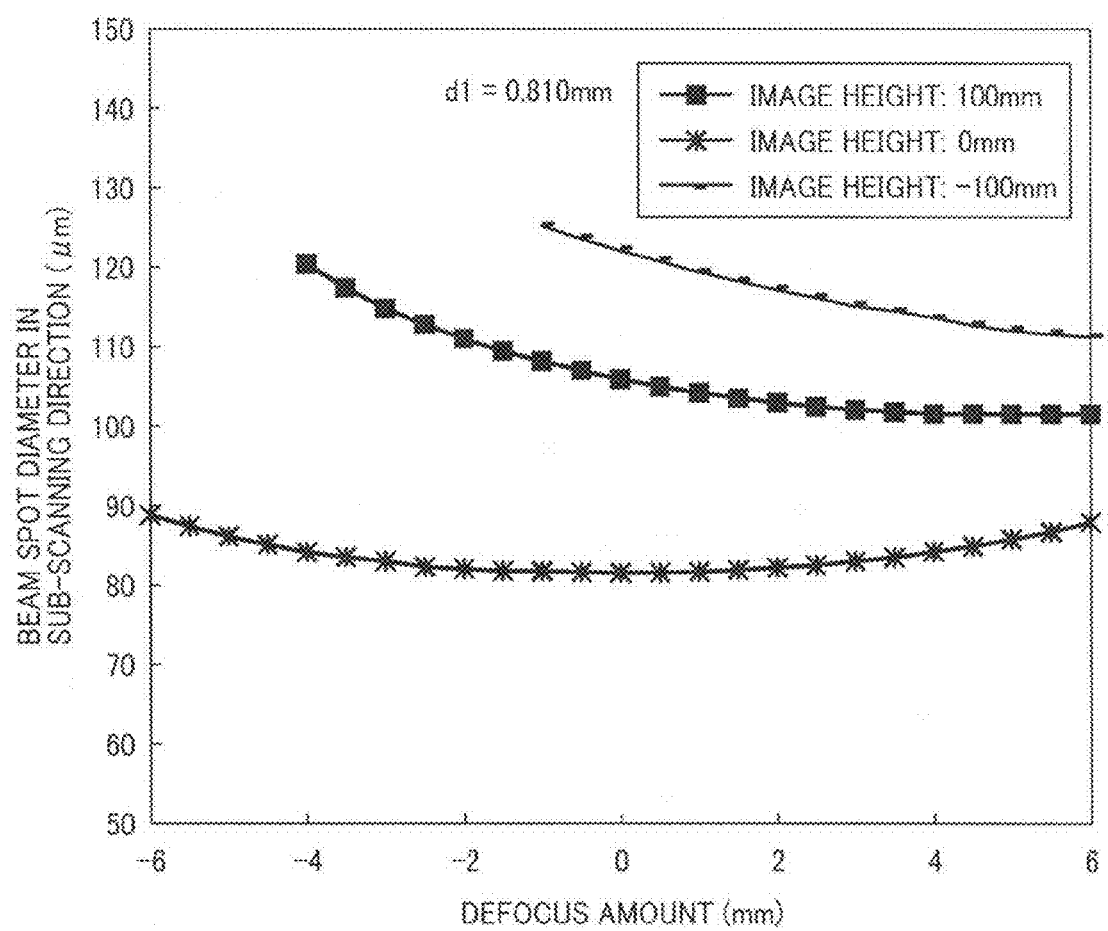
FIG. 27 is a diagram illustrating the relationship between the defocus amount and the beam spot diameter in the sub-scanning direction in horizontal incidence, wherein the distance in FIG. 22 is 0.810 mm.

FIG. 27 illustrates the relationship between the defocus amount and the beam spot diameter in the sub-scanning direction in a case where the light beam passes a position separated from the generatrix of the scanning lens by 0.810 mm in the horizontal incidence optical system. FIG. 28 illustrates the shape of the scanning lens in this case.

It is understood from FIGS. 23, 25, and 27 that the wavefront aberration is noticeably increased in accordance with the increase in the distance between the passage position of the light beam and the generatrix of the scanning lens.

Figure 29A:
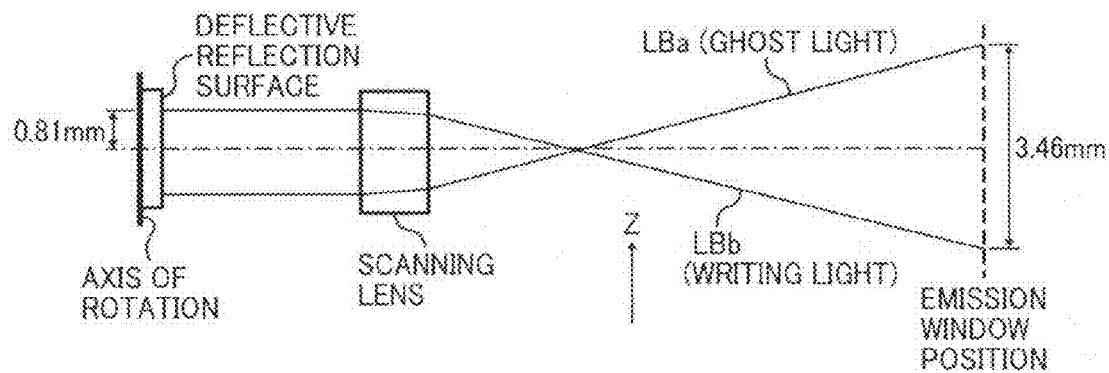
FIGS. 29A and 29B are diagrams for comparing horizontal incidence and oblique incidence.
Figure 29B:
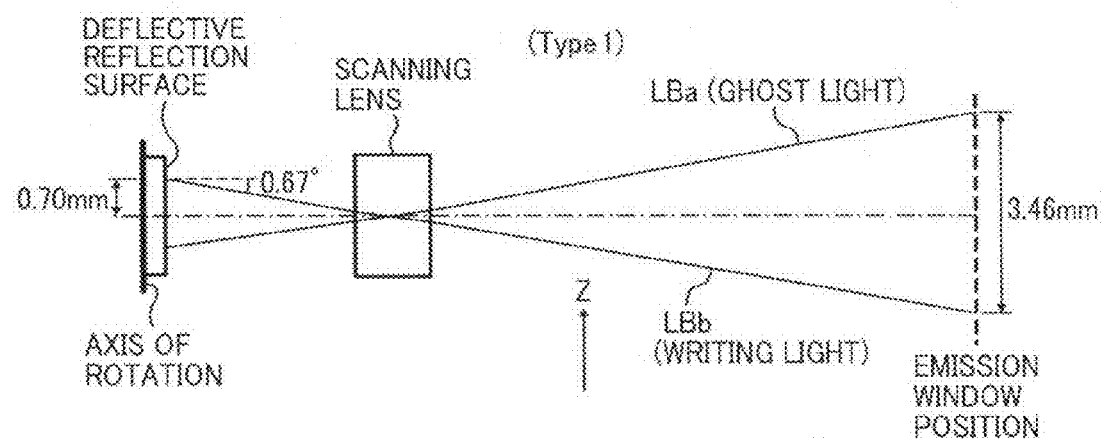

FIGS. 29A and 29B illustrate the horizontal incidence optical system and the oblique incidence optical system, respectively. The drawings illustrate, as an example, a case where the ghost light of the light beam LBa reaches a location near the emission window 2111b through which the writing light beam of the light beam LBb is transmitted. In this case, if the distance between the light beams LBa and LBb is relatively short at the emission window position, it is difficult to remove the ghost light. That is, the removal of the ghost light depends on the distance between the writing light beam and the ghost light at the emission window position.

In FIGS. 29A and 29B, to compare the wavefront aberration between the horizontal incidence optical system and the oblique incidence optical system in the configuration in which the respective reflection positions of the two light beams LBa and LBb on the deflective reflection surface are separated from each other in the Z-axis direction, the distance between the light beams LBa and LBb at the emission window position is set to approximately 3.46 mm in both the optical systems.

FIG. 30 illustrates the shape of the scanning lens in FIG. 29A, and FIG. 31 illustrates the shape of the scanning lens in FIG. 29B.

Figure 32:
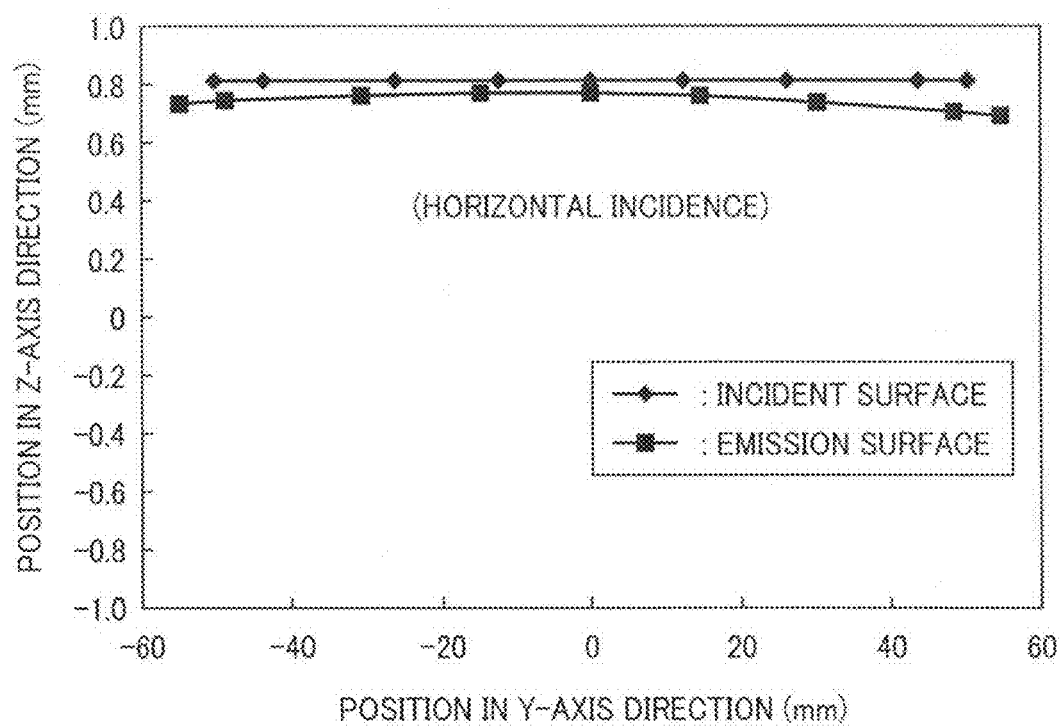
FIG. 32 is a diagram illustrating passage positions of a principal ray of a light beam in the scanning lens of FIG. 29A.
Figure 33A:
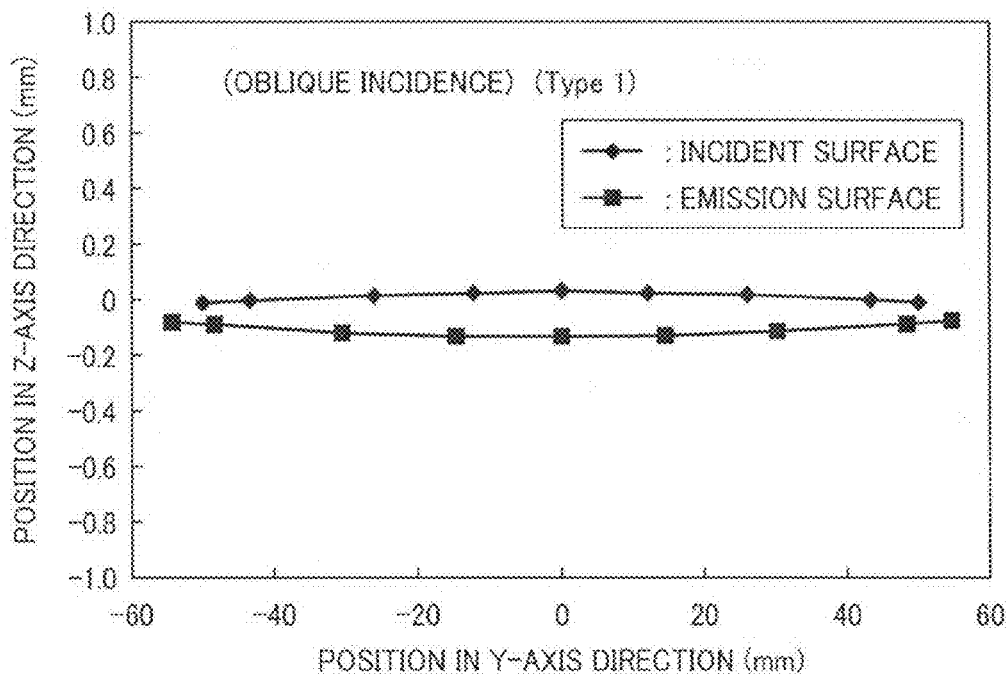
FIGS. 33A and 33B are diagrams illustrating passage positions of the principal ray of the light beam in the scanning lens of FIG. 29B, with the full scale on the vertical axis changed between FIGS. 33A and 33B.
Figure 33B:
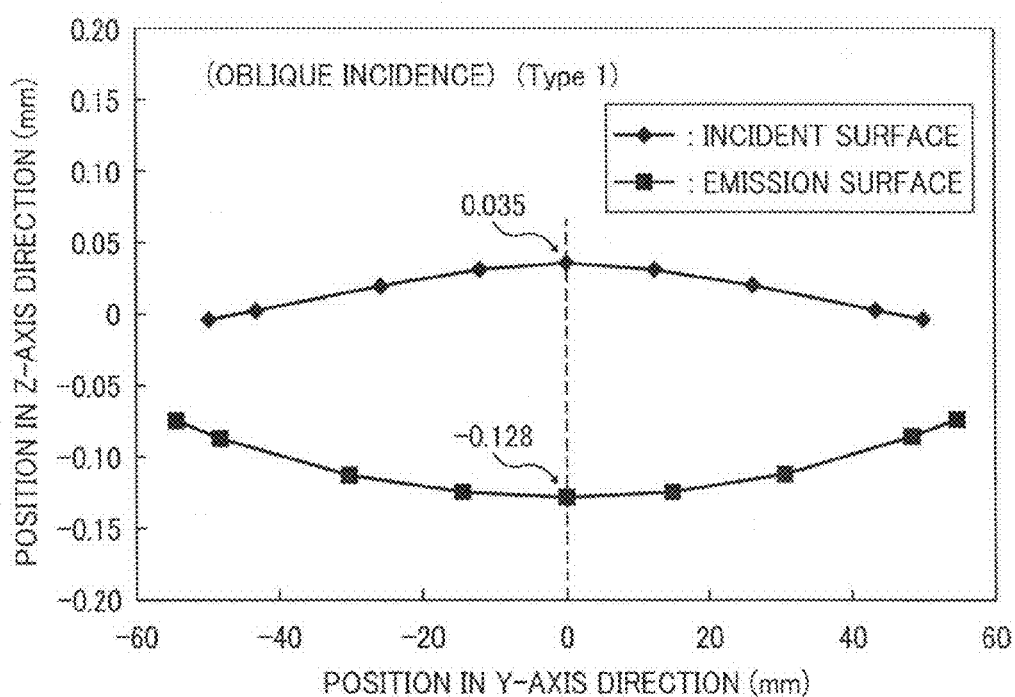

FIG. 32 illustrates passage positions of the principal ray of the light beam LBb in the scanning lens of FIG. 29A. FIGS. 33A and 33B illustrate passage positions of the principal ray of the light beam LBb in the scanning lens of FIG. 29B. In FIGS. 33A and 33B, when the position in the Y-axis direction is 0 mm, the position in the Z-axis direction of the principal ray of the light beam LBb on the incident surface, i.e., the incidence position of the principal ray of the light beam LBb is approximately 0.035 mm, and the position in the Z-axis direction of the principal ray of the light beam LBb on the emission surface, i.e., the emission position of the principal ray of the light beam LBb is approximately −0.128 mm. That is, in FIGS. 33A and 33B, the principal ray of the light beam LBb intersects the generatrix of the scanning lens.

Figure 34:
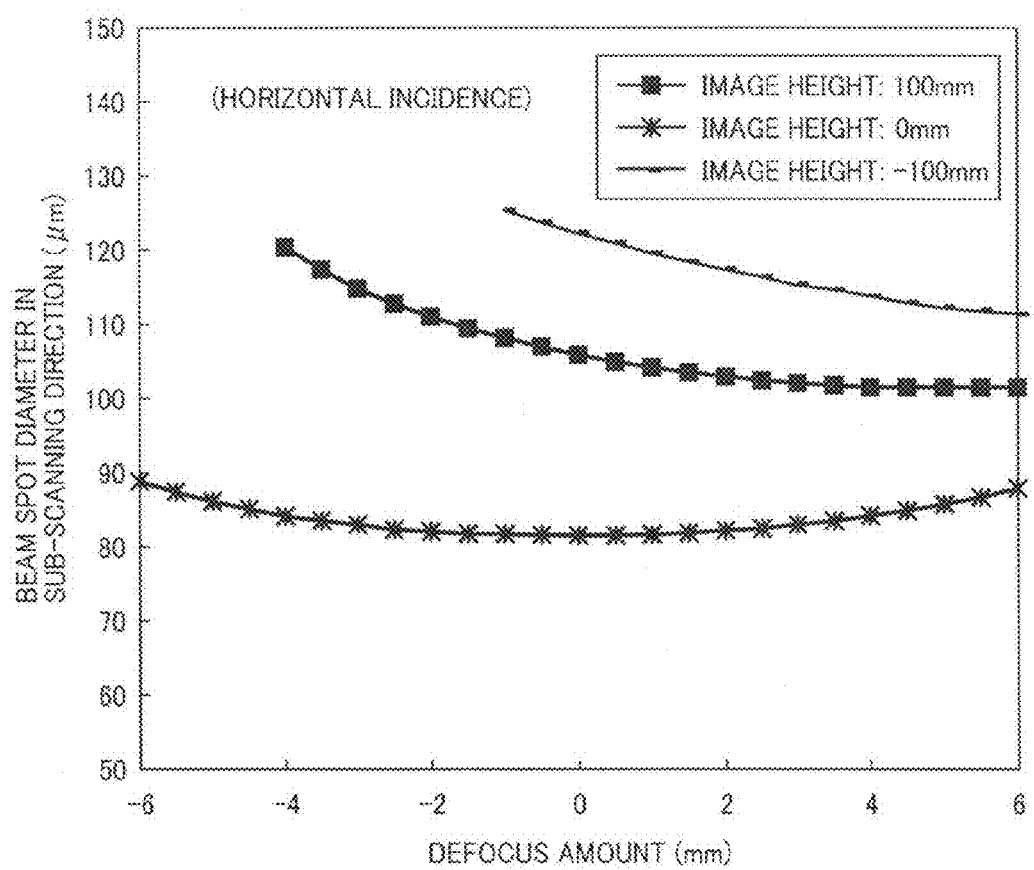
FIG. 34 is a diagram illustrating the relationship between the defocus amount and the beam spot diameter in the sub-scanning direction in FIG. 29A.
Figure 35:
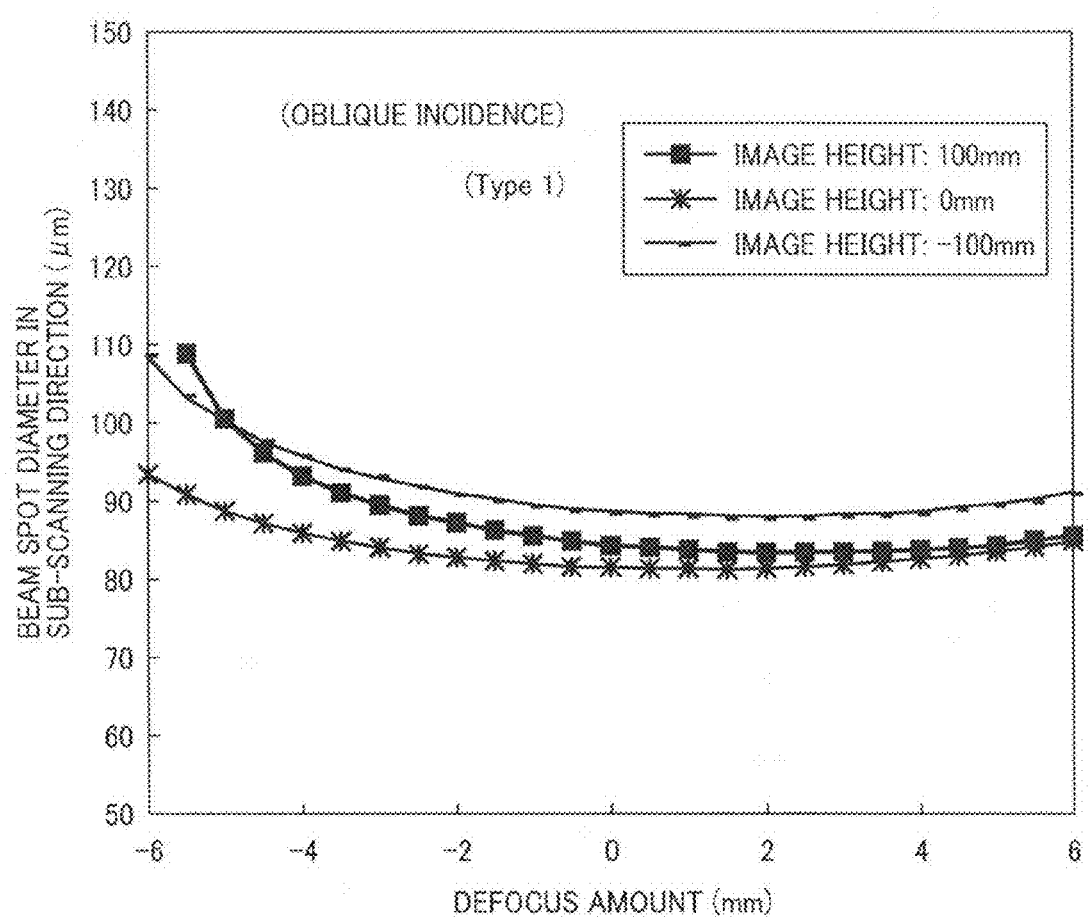
FIG. 35 is a diagram illustrating the relationship between the defocus amount and the beam spot diameter in the sub-scanning direction in FIG. 29B.

FIG. 34 illustrates the relationship between the defocus amount and the beam spot diameter in the sub-scanning direction on the photoconductor drum in the horizontal incidence optical system of FIG. 29A. FIG. 35 illustrates the relationship between the defocus amount and the beam spot diameter in the sub-scanning direction on the photoconductor drum in the oblique incidence optical system of FIG. 29B. In the horizontal incidence optical system, the beam spot diameter in the sub-scanning direction varies among the image heights. Meanwhile, in the oblique incidence optical system, the variation of the beam spot diameter in the sub-scanning direction among the image heights is relatively small.

It is understood from the above that, in the configuration in which the respective reflection positions of two light beams on the deflective reflection surface are separated from each other in the Z-axis direction, the wavefront aberration is smaller in the oblique incidence optical system than in the horizontal incidence optical system. This is a new finding made by the present inventors.

Figure 36:
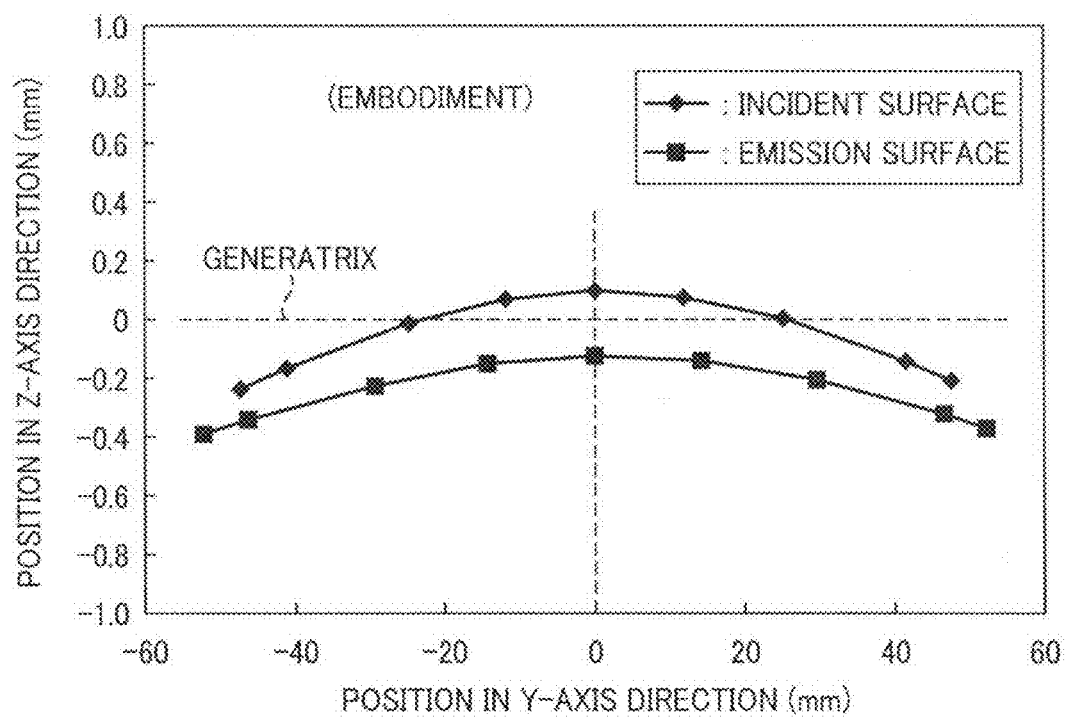
FIG. 36 is a diagram illustrating passage positions of the principal ray of the light beam in each of the scanning lenses in the present embodiment.
Figure 37:
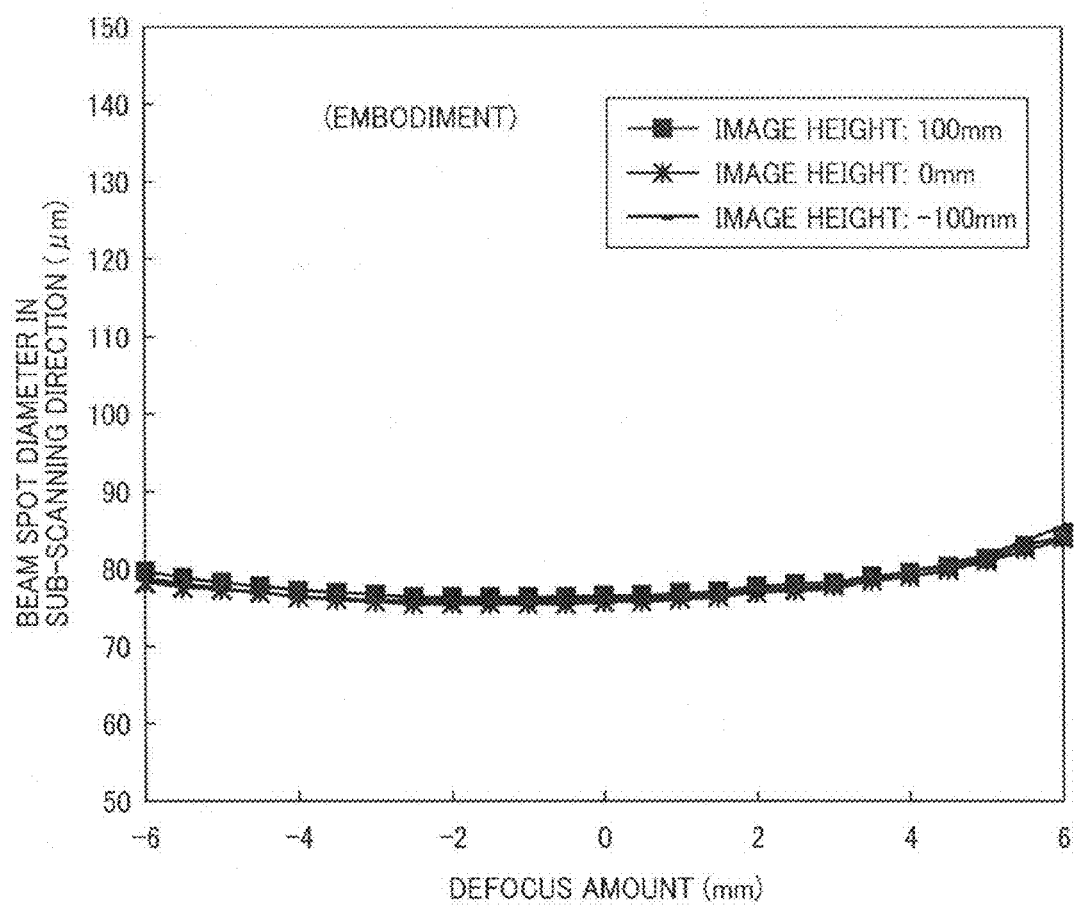
FIG. 37 is a diagram for explaining the relationship between the defocus amount and the beam spot diameter in the sub-scanning direction in the present embodiment.

In view of the above, the present embodiment is configured to employ the oblique incidence optical system and cause two light beams to intersect the generatrix of the scanning lens. FIG. 36 illustrates passage positions of the principal ray of the light beam LBb in the scanning lens 2105A. Further, FIG. 37 illustrates the relationship between the defocus amount and the beam spot diameter in the sub-scanning direction of the light beam LBb on the photoconductor drum 2030b. In FIG. 37, the data of the image height of 100 mm and the data of the image height of −100 mm substantially overlap each other.

In the present embodiment, the distance in the Z-axis direction between two light beams on the deflective reflection surface and the oblique incidence angle of each of the two light beams incident on the deflective reflection surface are set to allow the removal of the ghost lights at the emission window position. With this configuration, the removal of the ghost lights and the suppression of the wavefront aberration are both attained.

Further, in the configuration in which two light beams on the deflective reflection surface are separated from each other in the Z-axis direction, the oblique incidence has the effect of reducing the thickness of the optical scanning device and the image forming apparatus. When the distance between the writing light beam and the ghost light at the emission window position is set to approximately 3.46 mm, the distance in the Z-axis direction between the generatrix of the scanning lens and the reflection position of the writing light beam on the deflective reflection surface is approximately 0.81 mm in the horizontal incidence optical system, as illustrated in FIG. 29A, and approximately 0.70 mm in the oblique incidence optical system, as illustrated in FIG. 29B. That is, the oblique incidence allows the polygon mirror to be reduced in size in the Z-axis direction (i.e., height), and contributes to the reduction in thickness of the optical scanning device and the image forming apparatus.

Further, it is possible to set the size in the Z-axis direction (i.e., height) of the scanning lens smaller in the oblique incidence optical system than in the horizontal incidence optical system. Therefore, the degree of birefringence occurring in the scanning lens is reduced in the oblique incidence optical system.

Figure 38:
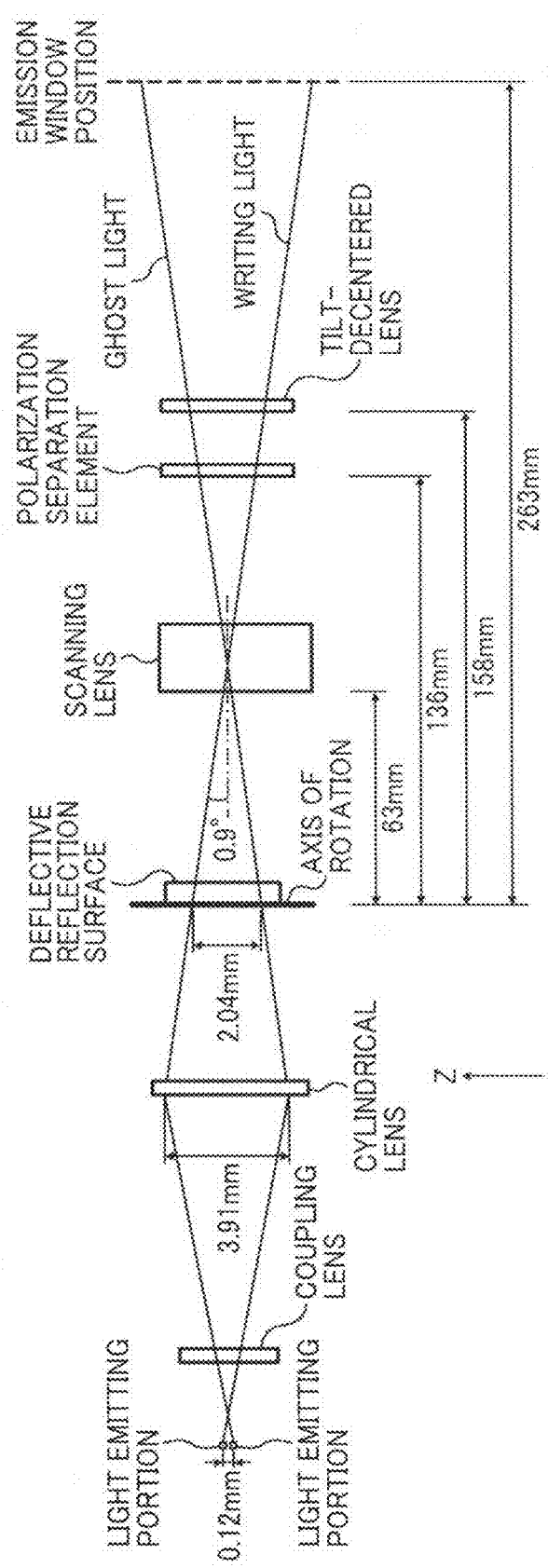
FIG. 38 is a diagram illustrating a configuration including one cylindrical lens shared by two light beams.

FIG. 38 illustrates a configuration including one cylindrical lens shared by two light beams in the oblique incidence optical system. Further, FIG. 39 illustrates a configuration including two cylindrical lenses individually provided for two light beams in the oblique incidence optical system. FIGS. 38 and 39 are similar in the configuration subsequent to the polygon mirror.

The interval in the Z-axis direction between two light emitting portions is approximately 0.12 mm in FIG. 38 and approximately 7.49 mm in FIG. 39. That is, the interval in the Z-axis direction between the two light emitting portions is substantially shorter in the configuration including one cylindrical lens shared by two light beams than in the configuration including two cylindrical lenses individually provided for two light beams.

Figure 40A:
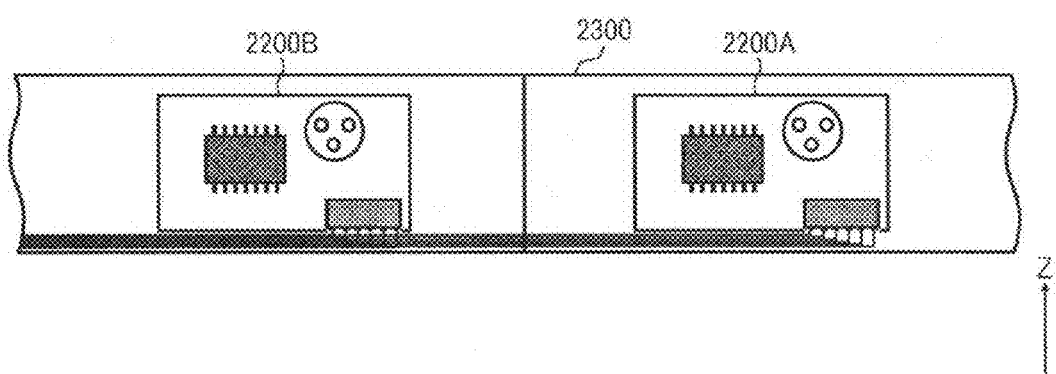
FIGS. 40A and 40B are diagrams illustrating an advantage of having one cylindrical lens shared by two light beams.
Figure 40B:
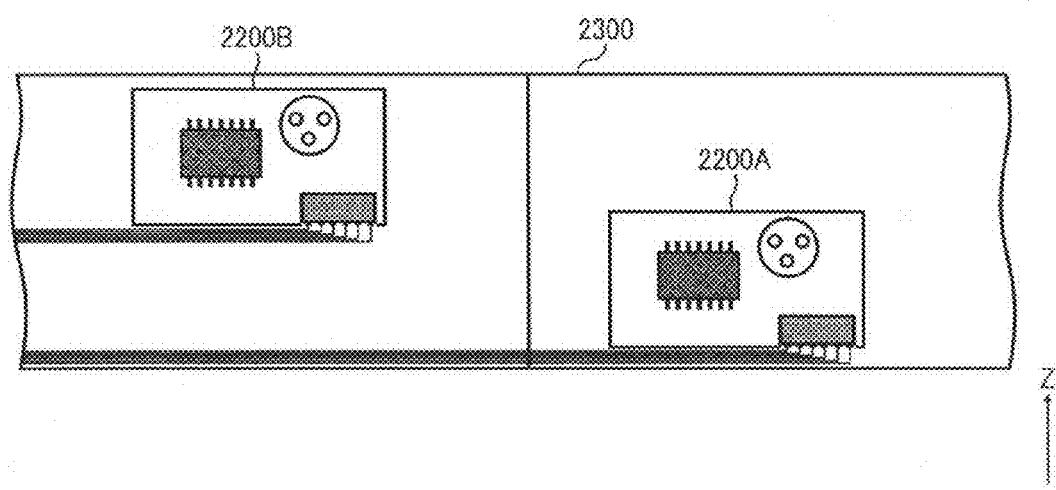

FIG. 40A illustrates an example of arrangement of the two light sources 2200A and 2200B in the configuration including one cylindrical lens shared by two light beams, and FIG. 40B illustrates an example of arrangement of the two light sources 2200A and 2200B in the configuration including two cylindrical lenses individually provided for two light beams. A circuit board mounted with the light source 2200A or 2200B has a size of approximately 20 mm or more in the Z-axis direction. In FIG. 40B, therefore, it is difficult to set the size in the Z-axis direction (i.e., thickness) of the optical housing 2300 to approximately 30 mm or less. That is, to reduce the thickness of the optical scanning device 2010, the configuration of FIG. 40A is preferred. In the present embodiment, therefore, the single cylindrical lens 2204A is shared by the two light beams LBa and LBb, and the single cylindrical lens 2204B is shared by the two light beams LBc and LBd. Accordingly, the optical housing 2300 is allowed to have a size in the Z-axis direction (i.e., thickness) of approximately 30 mm or less.

When the increase in wavefront aberration in the cylindrical lenses 2204A and 2204B is taken into account, it is desired to provide optical elements for correcting the increase in wavefront aberration. In the present embodiment, the tilt-decentered lenses 2107*a* to 2017*d* serve as such optical lenses.

In each of the tilt-decentered lenses 2107*a* to 2017*d*, the incident surface and the emission surface are non-power surfaces. However, the incident surface and the emission surface are not parallel to each other, and thus are capable of changing the light direction by using the prismatic effect. Further, the non-parallel relationship between the incident surface and the emission surface changes along the Z-axis direction. It is therefore possible to change the amount of change in light direction in accordance with the incidence position in the Z-axis direction.

Figure 41:
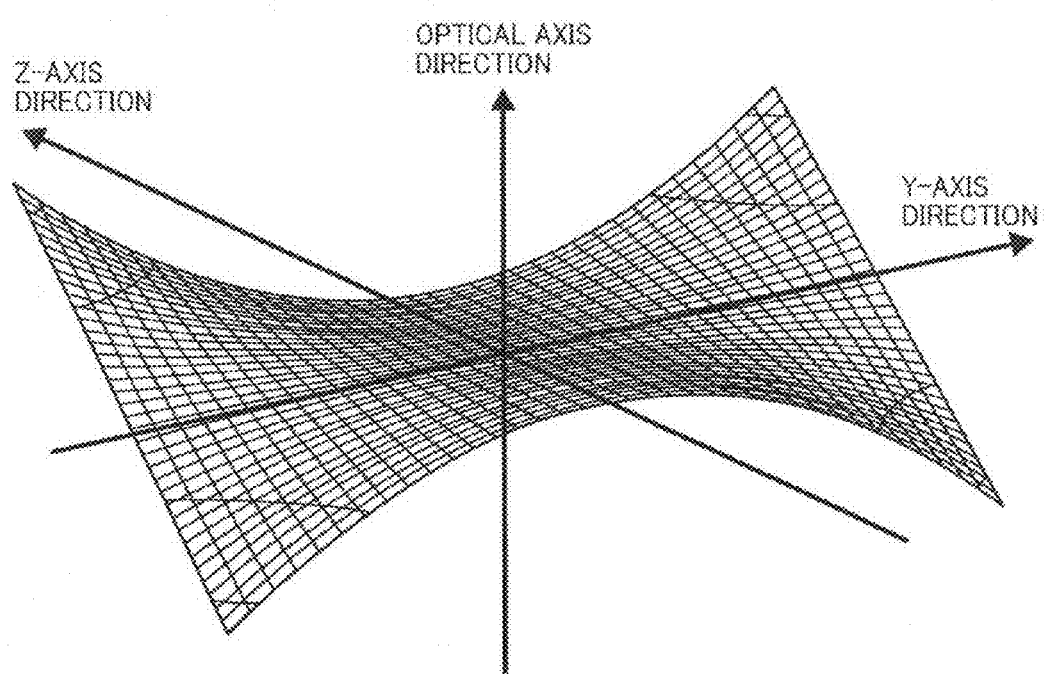
FIG. 41 is a diagram illustrating the shape of a tilt-decentered surface.

In each of the tilt-decentered lenses 2107*a* to 2017*d* in the present embodiment, the incident surface is planar, and the emission surface is tilted. Further, the amount of the tilt changes along the Z-axis direction, as illustrated in FIG. 41.

The change in the tilt amount is line-symmetrical about an axis parallel to the Z-axis direction. That is, each of the tilt-decentered lenses 2107*a* to 2017*d* has an axis of symmetry parallel to the axis of rotation of the polygon mirror 2104. If the change in the tilt amount is expressed by a polynomial, the values of odd-order coefficients of the distance y in the polynomial are all 0.

The configuration including tilt-decentered lenses each having an axis of symmetry parallel to the axis of rotation of the polygon mirror is advantageous in allowing tilt-decentered lenses of the same shape to be used for two light beams.

If the change in the tilt amount is expressed by a polynomial, and if the polynomial includes an odd-order term of the distance y, the sign of the odd-order term of one tilt-decentered lens is opposite to the sign of the odd-order term of the other tilt-decentered lens. In this case, therefore, the use of tilt-decentered lenses of the same shape for two light beams is not allowed.

In a strict sense, the magnitude of the wavefront aberration at the position of the photoconductor drum is asymmetrical relative to the position of the image height of 0 mm in the main scanning direction, i.e., in the Y-axis direction. However, as a practical matter the asymmetry is not substantial. Therefore, a tilt-decentered lens having an axis of symmetry is capable of sufficiently correcting the increase in wavefront aberration.

In the present embodiment, as well as the reduction in wavefront aberration, the correction of a bend of a scanning line is also taken into account in designing the tilt-decentered lenses 2107*a* to 2017*d*. If the change in the tilt amount of a tilt-decentered surface is expressed by a polynomial, it is possible to simplify the designing by separately handling constant terms and even-order terms of the distance y. That is, the wavefront aberration is reduced in the even-order terms of the distance y, and the bend of the scanning line is reduced in the constant terms.

The reduction in bend of the scanning line on the photoconductor drum indicates the improvement of the trace of the light beam transmitted through the emission window, i.e., improvement from a bent trace to a linear trace. Accordingly, the writing light beam and the ghost light are more easily separated from each other.

Further, in the present embodiment, the number of facets of the deflective reflection surface of the polygon mirror 2104 is four, and the light beams LBa and LBb reflected by the reflecting mirror M1 and the light beams LBc and LBd reflected by the reflecting mirror M2 are incident on mutually different facets of the deflective reflection surface. Further, the angle formed between the light beams LBa and LBb incident on the polygon minor 2104 via the reflecting mirror M1 and the light beams LBc and LBd incident on the polygon mirror 2104 via the reflecting mirror M2 is set to be approximately 90 degrees in a plan view.

Therefore, the light beams LBa and LBd do not simultaneously scan the respective image forming areas of the corresponding photoconductor drums 2030*a* and 2030*d*, and the light beams LBb and LBc do not simultaneously scan the respective image forming areas of the corresponding photoconductor drums 2030*b* and 2030*c*.

Figure 42:
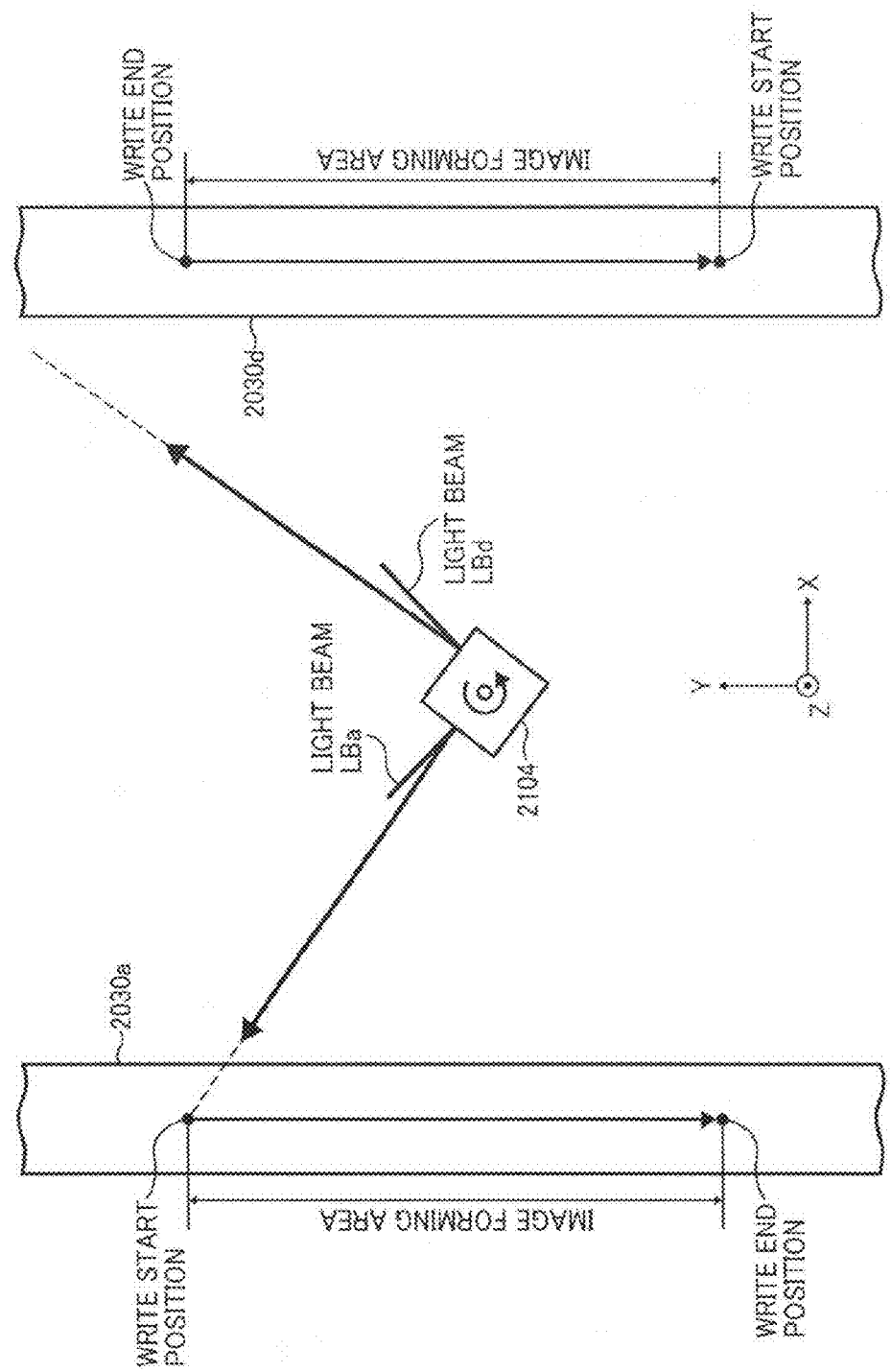
FIG. 42 is a diagram illustrating respective optical paths of two light beams reflected by different facets of the deflective reflection surface of the polygon mirror.

For example, as illustrated in FIG. 42, when the light beam LBa reflected by the deflective reflection surface of the polygon mirror 2104 travels to a write start position on the photoconductor drum 2030*a*, the light beam LBd reflected by the deflective reflection surface of the polygon mirror 2104 travels to a position on the +Y direction side of a write end position on the photoconductor drum 2030*d*.

Figure 43:
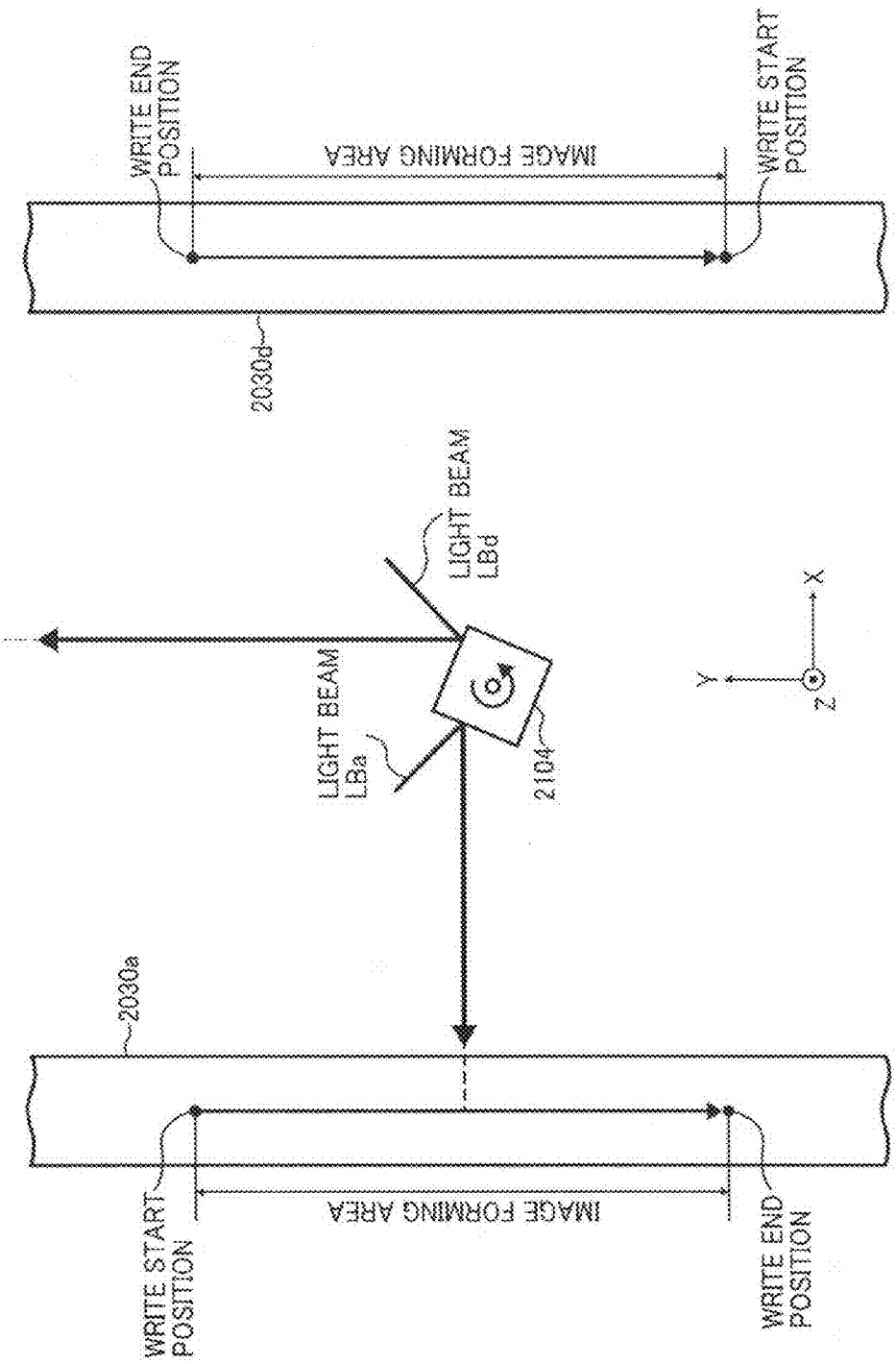
FIG. 43 is another diagram illustrating the optical paths of the two light beams reflected by the different facets of the deflective reflection surface of the polygon mirror.

Then, as illustrated in FIG. 43, when the light beam LBa reflected by the deflective reflection surface of the polygon mirror 2104 travels to the central position of the image forming area of the photoconductor drum 2030*a* corresponding to the image height of 0 mm, the light beam LBd reflected by the deflective reflection surface of the polygon mirror 2104 travels in the +Y direction.

Then, when the light beam LBa reflected by the deflective reflection surface of the polygon mirror 2104 crosses the central position of the image forming area of the photoconductor drum 2030*a* corresponding to the image height of 0 mm, the facet of the deflective reflection surface of the polygon mirror 2104 currently reflecting the light beam LBd shifts to a different facet of the deflective reflection surface. As a result, the direction of the light beam LBd reflected by the deflective reflection surface of the polygon mirror 2104 shifts from the +Y direction to the −Y direction.

Figure 44:
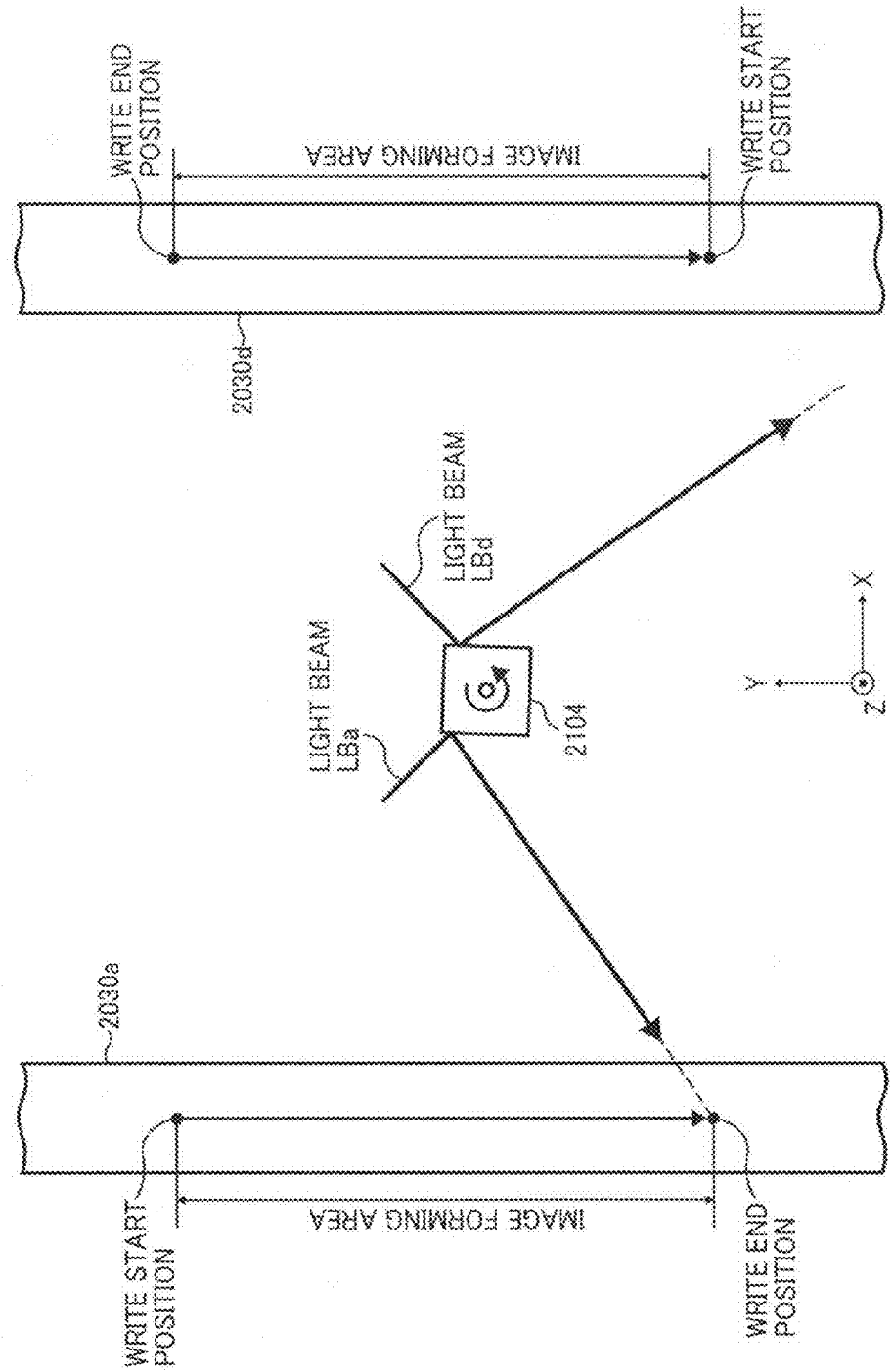
FIG. 44 is still another diagram illustrating the optical paths of the two light beams reflected by the different facets of the deflective reflection surface of the polygon mirror.

Then, as illustrated in FIG. 44, when the light beam LBa reflected by the deflective reflection surface of the polygon mirror 2104 travels to a write end position of the image forming area of the photoconductor drum 2030*a*, the light beam LBd reflected by the deflective reflection surface of the polygon mirror 2104 travels to a position on the −Y direction side of a write start position on the photoconductor drum 2030d.

As described above, when the image forming area of the photoconductor drum 2030a is being scanned with the light beam LBa reflected by the deflective reflection surface of the polygon mirror 2104, the light beam LBd reflected by the deflective reflection surface of the polygon mirror 2104 does not travel into the image forming area of the photoconductor drum 2030d.

Further, when the image forming area of the photoconductor drum 2030d is being scanned with the light beam LBd reflected by the deflective reflection surface of the polygon mirror 2104, the light beam LBa reflected by the deflective reflection surface of the polygon mirror 2104 does not travel into the image forming area of the photoconductor drum 2030a.

Similarly, when the image forming area of the photoconductor drum 2030b is being scanned with the light beam LBb reflected by the deflective reflection surface of the polygon mirror 2104, the light beam LBc reflected by the deflective reflection surface of the polygon mirror 2104 does not travel into the image forming area of the photoconductor drum 2030c.

Further, when the image forming area of the photoconductor drum 2030c is being scanned with the light beam LBc reflected by the deflective reflection surface of the polygon mirror 2104, the light beam LBb reflected by the deflective reflection surface of the polygon mirror 2104 does not travel into the image forming area of the photoconductor drum 2030b.

When the image forming area of the photoconductor drum 2030a is scanned with the light beam LBa, therefore, the light beam LB1 is modulated in accordance with the black image data. Further, when the image forming area of the photoconductor drum 2030d is scanned with the light beam LBd, the light beam LB1 is modulated in accordance with the yellow image data.

Similarly, when the image forming area of the photoconductor drum 2030b is scanned with the light beam LBb, the light beam LB2 is modulated in accordance with the cyan image data. Further, when the image forming area of the photoconductor drum 2030c is scanned with the light beam LBc, the light beam LB2 is modulated in accordance with the magenta image data.

The angle formed between the light beams LBa and LBb incident on the polygon mirror 2104 via the reflecting mirror M1 and the light beams LBc and LBd incident on the polygon mirror 2104 via the reflecting mirror M2 may be slightly different from the angle of 90 degrees in a plan view.

Figure 45:
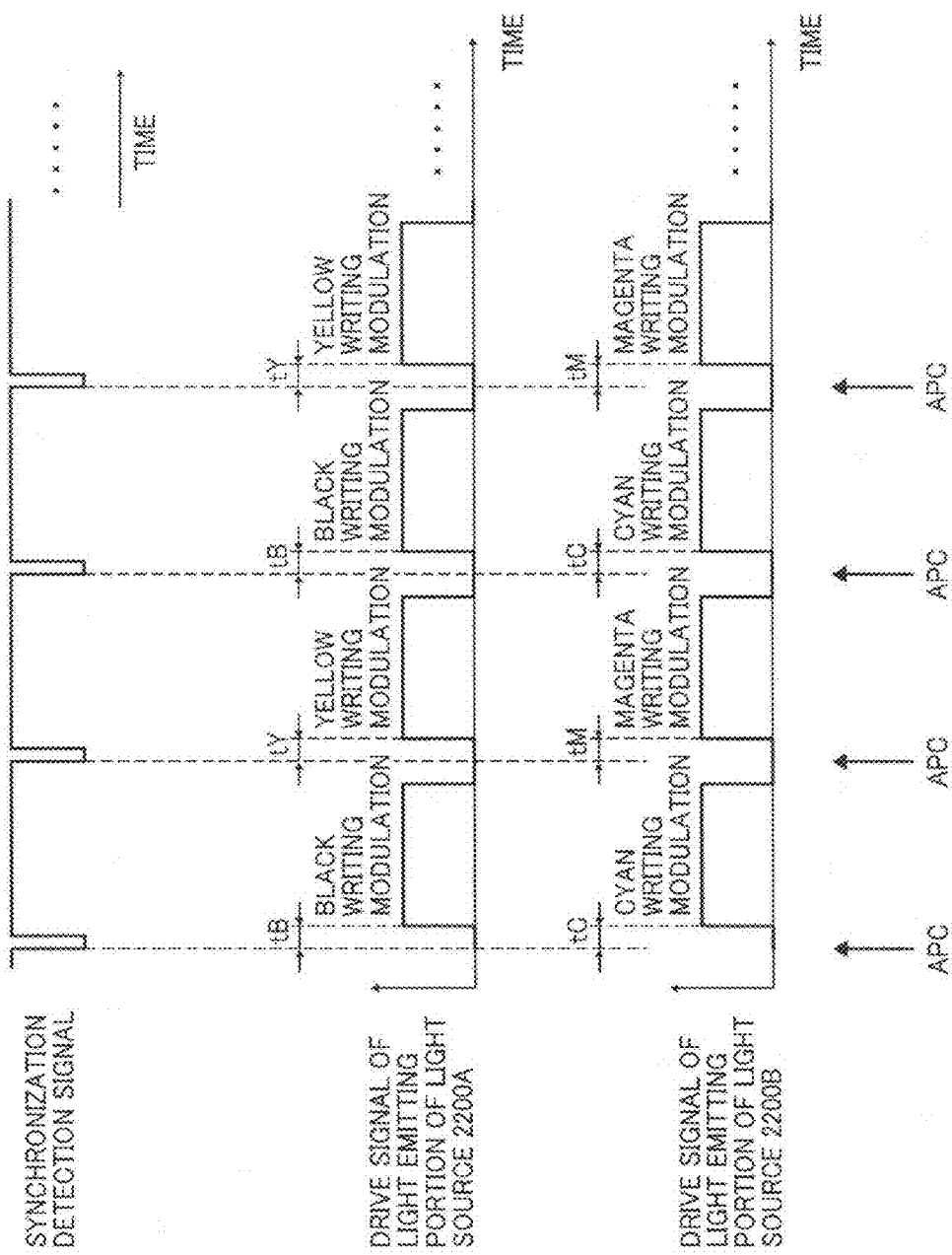
FIG. 45 is a timing chart illustrating the operation of a scanning control device of the optical scanning device.

With reference to the timing chart of FIG. 45, a description will now be given of the operation of the not-illustrated scanning control device performed when the latent images are formed on the photoconductor drums 2030a to 2030d.

A not-illustrated synchronization detection sensor first detects a light, and a synchronization detection signal output from the synchronization detection sensor shifts from a HIGH level to a LOW level. Then, the count value of a not-illustrated timer is reset to 0. Thereafter, the scanning control device performs an auto power control (APC). When the count value of the timer shifts to tB, the scanning control device controls the drive circuit of the light source 2200A such that the light beam LB1 modulated in accordance with the black image data is emitted from the light source 2200A. Thereby, the image forming area of the photoconductor drum 2030a is scanned with the light beam LBa. Similarly, when the count value of the timer shifts to tC, the scanning control device controls the drive circuit of the light source 2200B such that the light beam LB2 modulated in accordance with the cyan image data is emitted from the light source 2200B. Thereby, the image forming area of the photoconductor drum 2030b is scanned with the light beam LBb.

Ideally, tB and tC are equal in value. However, a color shift may be caused by a factor such as the temperature distribution. In that case, tB and tC may be set to different values.

Then, when the synchronization detection signal shifts from the HIGH level to the LOW level, the count value of the timer is reset to 0. Thereafter, the scanning control device performs the APC. When the count value of the timer shifts to tY, the scanning control device controls the drive circuit of the light source 2200A such that the light beam LB1 modulated in accordance with the yellow image data is emitted from the light source 2200A. Thereby, the image forming area of the photoconductor drum 2030d is scanned with the light beam LBd. Similarly, when the count value of the timer shifts to tM, the scanning control device controls the drive circuit of the light source 2200B such that the light beam LB2 modulated in accordance with the magenta image data is emitted from the light source 2200B. Thereby, the image forming area of the photoconductor drum 2030c is scanned with the light beam LBc.

Ideally, tY and tM are equal in value. However, a color shift may be caused by a factor such as the temperature distribution. In that case, tY and tM may be set to different values.

Thereafter, the above-described steps of the operation are repeated. With this operation, writing on the four photoconductor drums 2030a to 2030d is performed with the two light sources 2200A and 2200B. Respective appropriate values of tB, tC, tY, and tM are previously calculated for the individual optical scanning device 2010, and are stored in a memory of the scanning control device.

It is assumed in FIG. 45 that the light amount of each of the light beams LB1 and LB2 respectively emitted from the light sources 2200A and 2200B (hereinafter simply referred to as the light emission amount) is constant. If the transmission rate and the reflection rate of each of the optical elements are relatively different from each other, however, the light beams LBa to LBd reaching the respective photoconductor drums 2030a to 2030d may have different light amounts. In that case, the light emission amount may be adjusted for each of the photoconductor drums 2030a to 2030d such that the light beams LBa to LBd reaching the photoconductor drums 2030a to 2030d have substantially the same light amount.

In the foregoing description, the single light beam LB1 is emitted from the light source 2200A, and the single light beam LB2 is emitted from the light source 2200B. However, a plurality of light beams may be emitted from each of the light sources 2200A and 2200B. In that case, the increase in pixel density and the increase in image forming speed are attained.

As described above, the optical scanning device 2010 according to the present embodiment includes, for example, the two light source units LU1 and LU2, the beam splitter 2205, the two cylindrical lenses 2204A and 2204B, the two reflecting mirrors M1 and M2, the polygon mirror 2104, the scanning optical system A, the scanning optical system B, and the scanning control device.

The cylindrical lens 2204A is shared by the two light beams LBa and LBb, and the cylindrical lens 2204B is shared by the two light beams LBc and LBd. The two light beams LBa and LBb emitted from the cylindrical lens 2204A are obliquely incident on the same facet of the deflective reflection surface of the polygon mirror 2104, while being separated from each other in the Z-axis direction. Further, the two light beams LBc and LBd emitted from the cylindrical lens 2204B are obliquely incident on the same facet of the deflective reflection surface of the polygon mirror 2104, while being separated from each other in the Z-axis direction.

The scanning optical system A includes the scanning lens 2105A, the polarization separation element 2110A, the two tilt-decentered lenses 2107a and 2107b, and the five turning mirrors 2106a, 2106b, 2108a, 2108b, and 2109a.

The scanning optical system B includes the scanning lens 2105B, the polarization separation element 2110B, the two tilt-decentered lenses 2107c and 2107d, and the five turning mirrors 2106c, 2106d, 2108c, 2108d, and 2109d.

The two light beams LBa and LBb reflected by the same facet of the deflective reflection surface of the polygon mirror 2104 intersect between the incident surface of the emission surface of the scanning lens 2105A. Further, the two light beams LBc and LBd reflected by the same facet of the deflective reflection surface of the polygon mirror 2104 intersect between the incident surface of the emission surface of the scanning lens 2105B.

Each of the tilt-decentered lenses 2107a and 2107d corrects the increase in wavefront aberration occurring in the corresponding one of the cylindrical lenses 2204A and 2204B, and suppresses the bend of the scanning line. However, it is not necessarily required to provide a tilt-decentered lens on both the transmission side and the reflection side of a polarization separation element. For example, a polarization separation element may be configured such that the bend of the scanning line is appropriately corrected on the reflection side thereof, and a tilt-decentered lens for correcting the bend of the scanning line occurring in the transmission of the light beam through the polarization separation element may be provided on the transmission side of the polarization separation element.

This configuration allows the ghost light and the writing light beam at the emission window position to be separated from each other by a distance allowing the removal of the ghost light, and suppresses the increase in wavefront aberration occurring in the scanning lenses. That is, the removal of ghost lights and the reduction in device size are attained without an increase in beam spot diameter on the outer circumferential surfaces of the photoconductor drums.

Further, the color printer 2000 includes the optical scanning device 2010, and thus a reduction in apparatus size is attained without degradation of the image quality.

Figure 46:
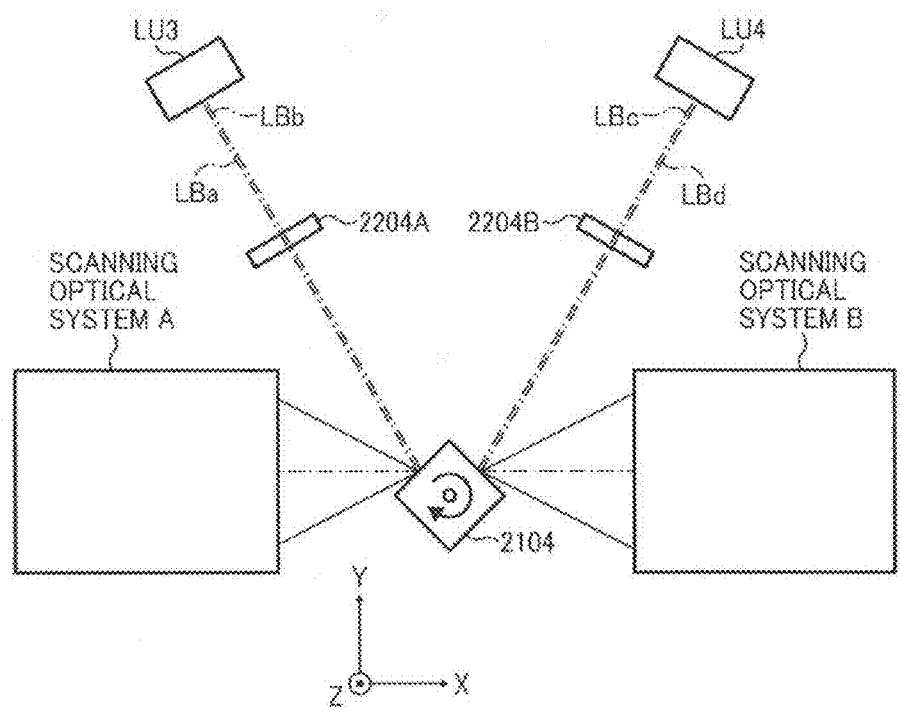
FIG. 46 is a diagram illustrating a first modified example of the optical scanning device.

In the above-described embodiment, the light source units LU1 and LU2 may be replaced by light source units LU3 and LU4 each including two light sources, as illustrated in FIG. 46. In this case, the respective image forming areas of the four photoconductor drums 2030a to 2030d are substantially simultaneously scanned. That is, the image forming speed is increased.

Figure 47:
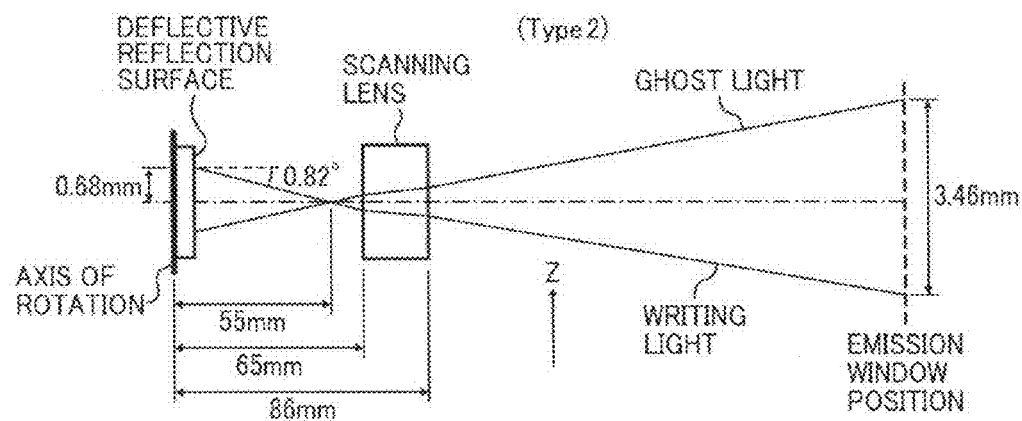
FIG. 47 is a diagram illustrating a second type of optical system.

Further, in the above-described embodiment, the two light beams LBa and LBb or LBc and LBd reflected by the same facet of the deflective reflection surface and traveling to the center in the Y-axis direction of the effective scanning area in the incident surface of the scanning lens 2105A or 2105B may intersect in front of the incident surface of the scanning lens 2105A or 2105B, as illustrated in an example of FIG. 47. In this case, a further reduction in size in the Z-axis direction of the polygon mirror 2104 is attained. For convenience, the optical system illustrated in FIG. 47 will be hereinafter also referred to as the optical system of Type 2 to distinguish the optical system from the optical system of Type 1 illustrated in FIG. 21.

Figure 49A:
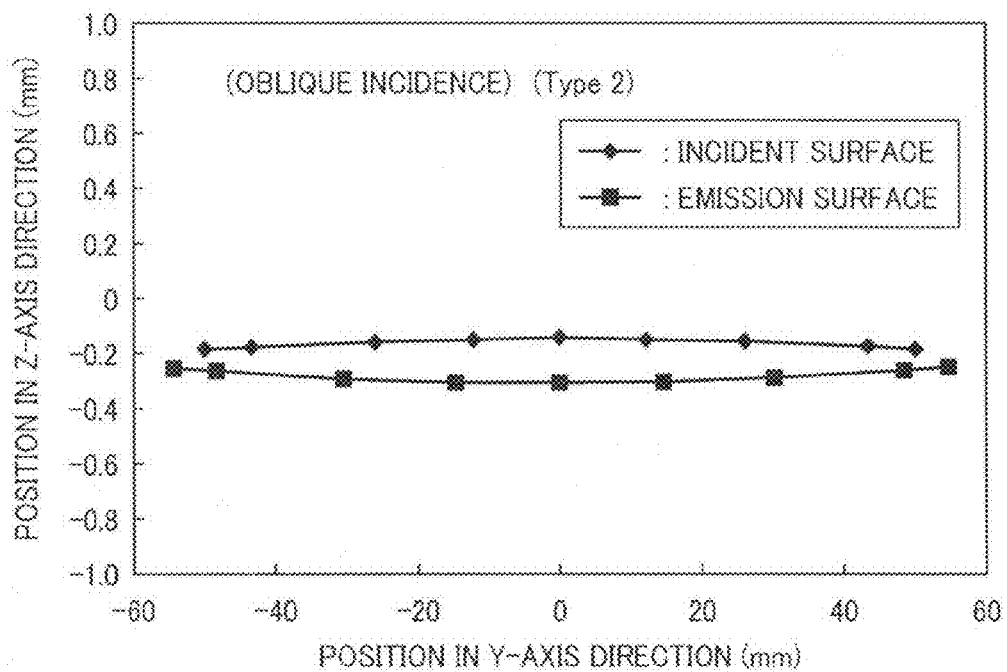
FIGS. 49A and 49B are diagrams illustrating passage positions of the principal ray of the light beam in the scanning lens of the second type of optical system, with the full scale on the vertical axis changed between FIGS. 49A and 49B.
Figure 49B:
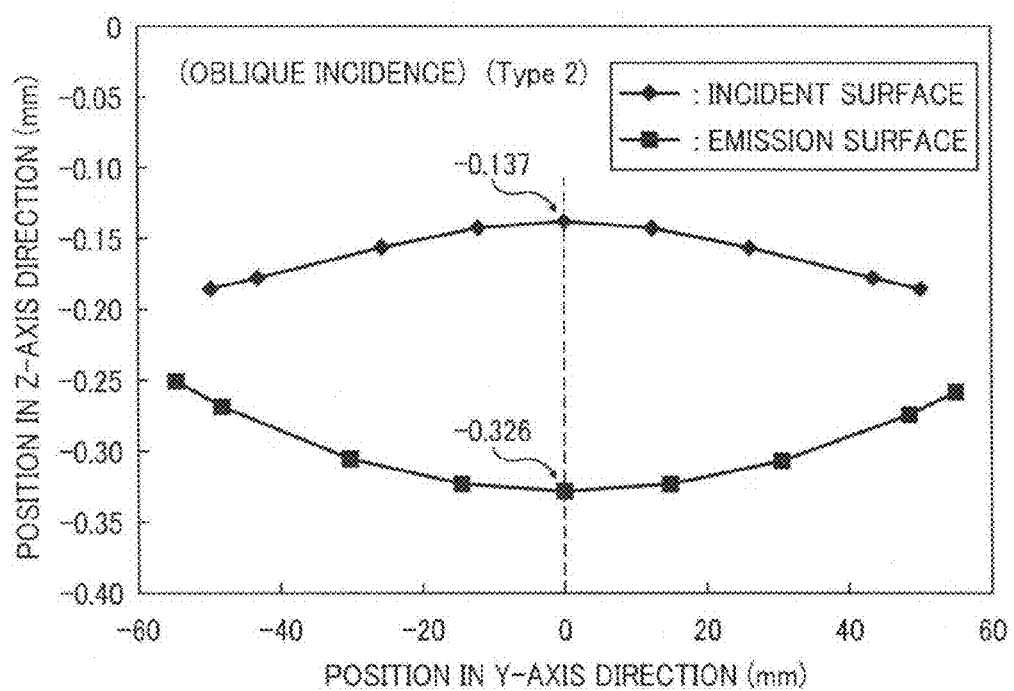
Figure 50:
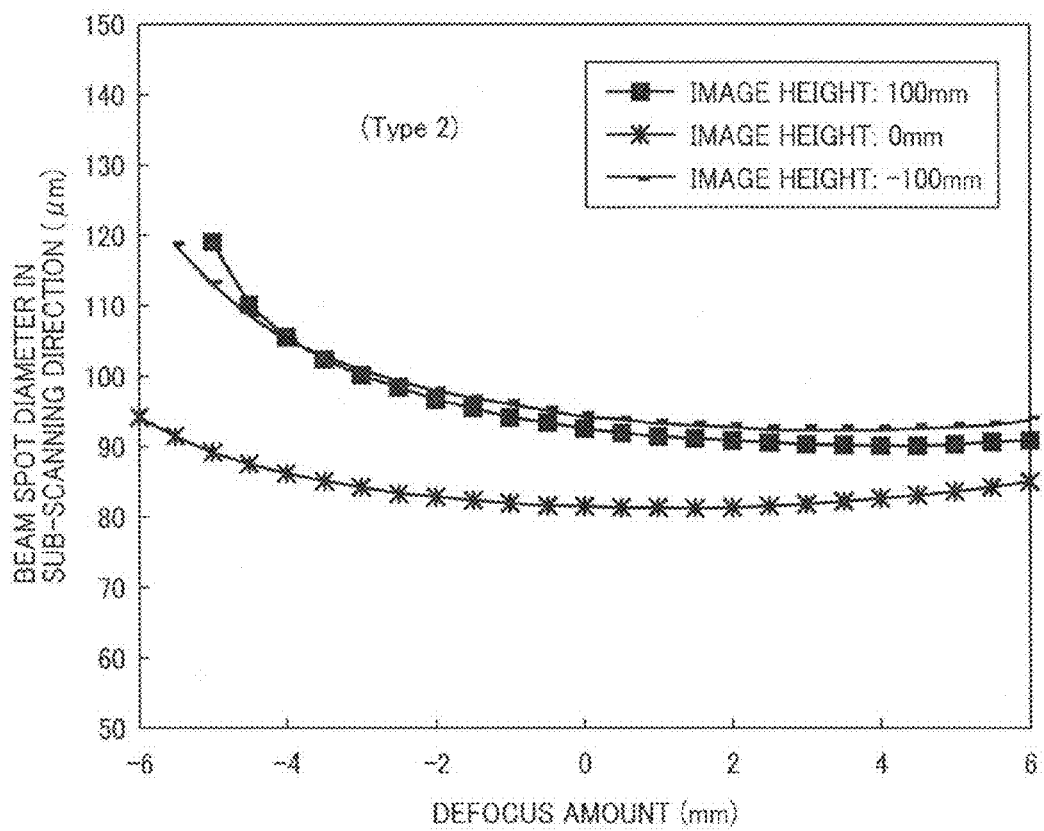
FIG. 50 is a diagram illustrating the relationship between the defocus amount and the beam spot diameter in the sub-scanning direction in the second type of optical system.

FIG. 48 illustrates the shape of the scanning lens in the optical system of Type 2. FIGS. 49A and 49B illustrate passage positions of the principal ray of the light beam LBb in the scanning lens of the optical system of Type 2. In the optical system of Type 2, when the position in the Y-axis direction is 0 mm, the position in the Z-axis direction of the principal ray of the light beam LBb on the incident surface, i.e., the incidence position of the principal ray of the light beam LBb is approximately −0.137 mm, and the position in the Z-axis direction of the principal ray of the light beam LBb on the emission surface, i.e., the emission position of the principal ray of the light beam LBb is approximately −0.326 mm Further, FIG. 50 illustrates the relationship between the defocus amount and the beam spot diameter in the sub-scanning direction of the light beam LBb on the photoconductor drum 2030b in this case. The variation of the beam spot diameter in the sub-scanning direction among the image heights is smaller in the optical system of Type 2 than in the horizontal incidence optical system illustrated in FIG. 27.

Figure 51:
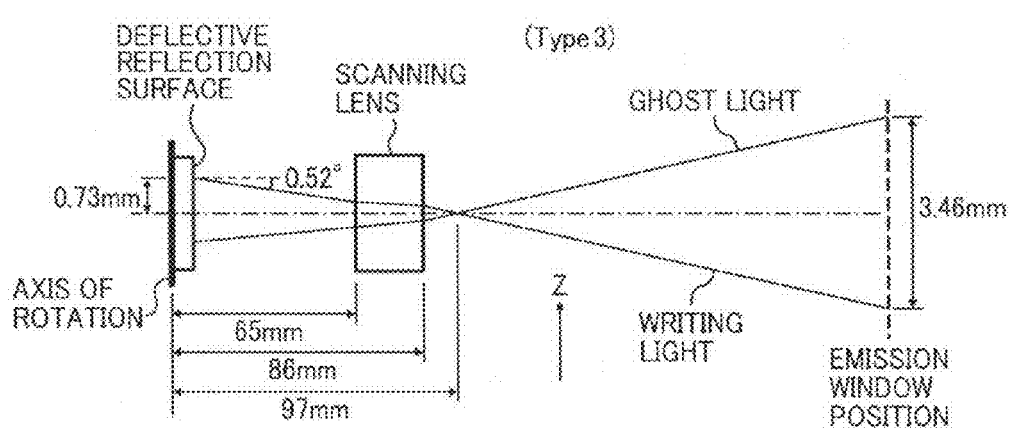
FIG. 51 is a diagram illustrating a third type of optical system.

Further, in the above-described embodiment, the two light beams LBa and LBb or LBc and LBd reflected by the same facet of the deflective reflection surface and incident on the center in the Y-axis direction of the effective scanning area in the incident surface of the scanning lens 2105A or 2105B may intersect behind the emission surface of the scanning lens 2105A or 2105B, as illustrated in an example of FIG. 51. In this case, a reduction in size of the polarization separation elements 2110A and 2110B is attained. For convenience, the optical system illustrated in FIG. 51 will be hereinafter also referred to as the optical system of Type 3.

Figure 53A:
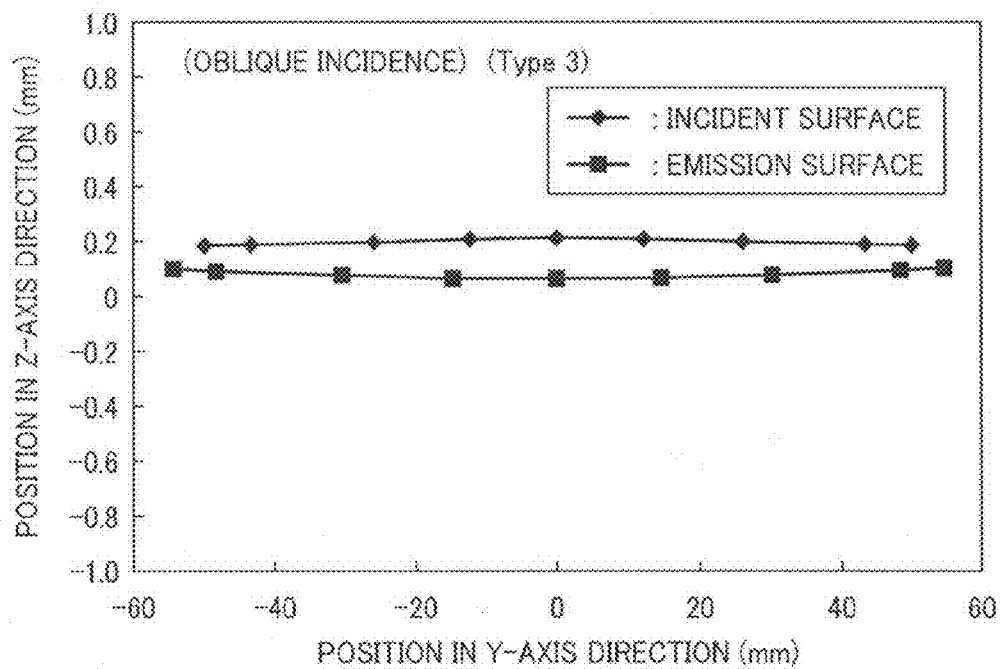
FIGS. 53A and 53B are diagrams illustrating passage positions of the principal ray of the light beam in the scanning lens of the third type of optical system, with the full scale on the vertical axis changed between FIGS. 53A and 53B.
Figure 53B:
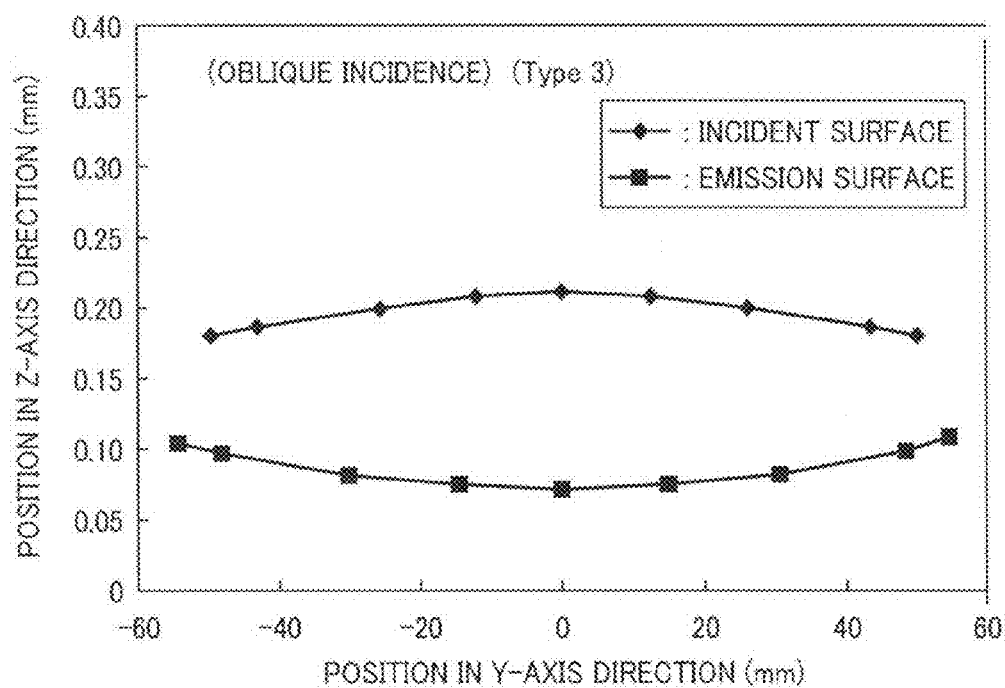

FIG. 52 illustrates the shape of the scanning lens in the optical system of Type 3. FIGS. 53A and 53B illustrate passage positions of the principal ray of the light beam LBb in the scanning lens of the optical system of Type 3. In the optical system of Type 3, when the position in the Y-axis direction is 0 mm, the position in the Z-axis direction of the principal ray of the light beam LBb on the incident surface, i.e., the incidence position of the principal ray of the light beam LBb is approximately 0.210 mm, and the position in the Z-axis direction of the principal ray of the light beam LBb on the emission surface, i.e., the emission position of the principal ray of the light beam LBb is approximately 0.073 mm.

Figure 54:
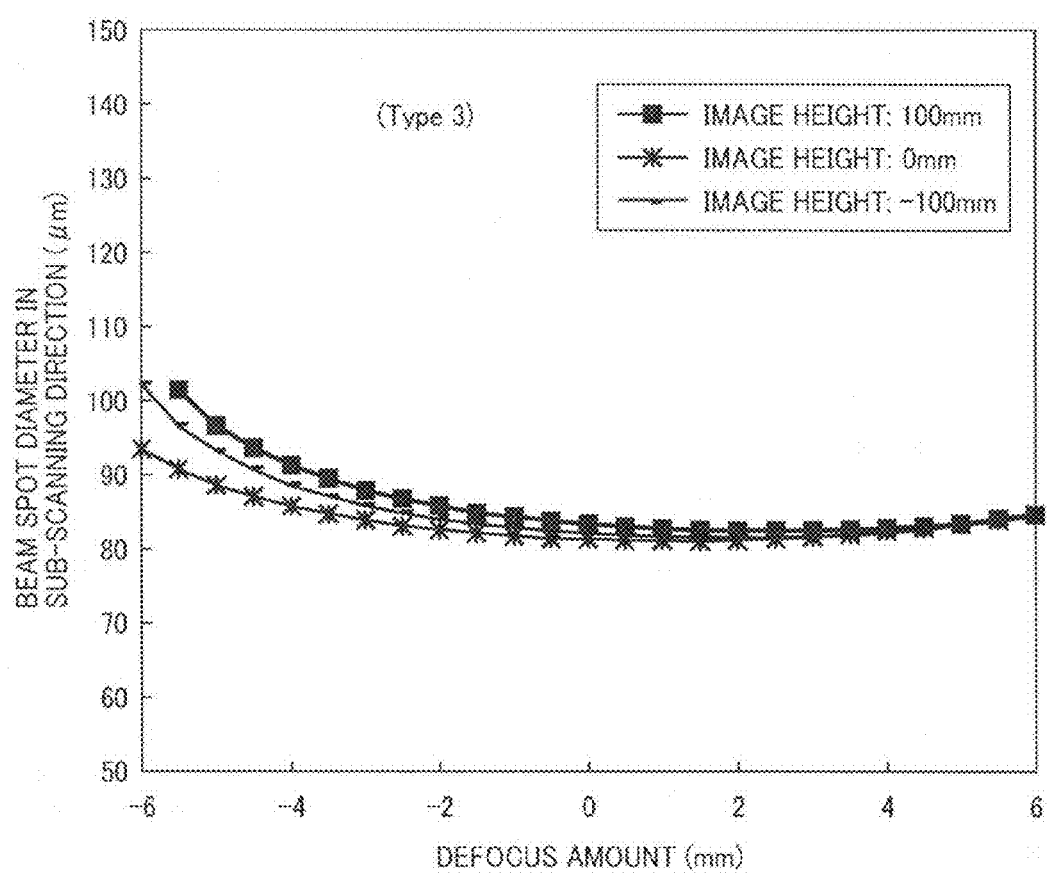
FIG. 54 is a diagram illustrating the relationship between the defocus amount and the beam spot diameter in the sub-scanning direction in the third type of optical system.

Further, FIG. 54 illustrates the relationship between the defocus amount and the beam spot diameter in the sub-scanning direction of the light beam LBb on the photoconductor drum 2030b in this case. The variation of the beam spot diameter in the sub-scanning direction among the image heights is smaller in the optical system of Type 3 than in the horizontal incidence optical system illustrated in FIG. 27.

The above-described configuration examples of the optical systems of Type 1 to Type 3 are not provided with a tilt-decentered lens, and the wavelength of each of the light beams is approximately 782 nm. Further, the optical path length from the deflective reflection surface of the polygon mirror to the incident surface of each of the scanning lenses is approximately 57.112 mm, and the optical path length from the emission surface of the scanning mirror to the outer circumferential surface of the corresponding photoconductor drum is approximately 224 mm. The optical systems of Type 1 to Type 3, however, may be configured similarly as in the foregoing embodiment provided with the tilt-decentered lenses 2107a to 2107d such that the wavelength of each of the light beams is approximately 655 nm, the optical path length from the deflective reflection surface of the polygon mirror to the incident surface of each of the scanning lenses is approximately 55.112 mm, and the optical path length from the emission surface of the scanning lens to the outer circumferential surface of the corresponding photoconductor drum is approximately 229 mm.

Figure 55:
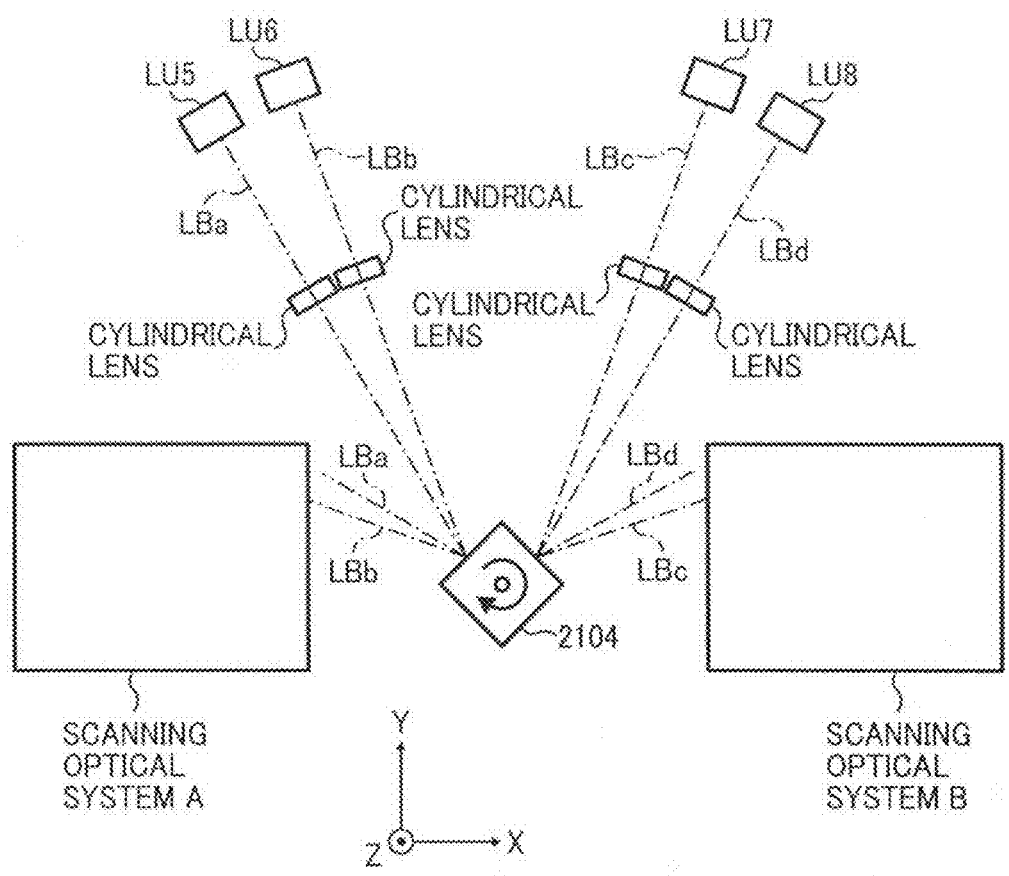
FIG. 55 is a diagram illustrating a second modified example of the optical scanning device.

Further, in the above-described embodiment, the light source units LU1 and LU2 may be replaced by light source units LU5 to LU8 each including one light source, as illustrated in FIG. 55. Further, when viewed in the Z-axis direction, the light beams LBa to LBd emitted from the light sources may travel to the polygon mirror 2104 from respective directions different from one another. In this case, the light beams LBa and LBb respectively emitted from the light source units LU5 and LU6 and reflected by the polygon mirror 2104 intersect when projected on the X–Z plane, but do not intersect when projected on the X–Y plane. Similarly, the light beams LBc and LBd respectively emitted from the light source units LU7 and LU8 and reflected by the polygon mirror 2104 intersect when projected on the X–Z plane, but do not intersect when projected on the X–Y plane.

Further, in the above-described embodiment, if p-polarized light is emitted from the light source 2200A, the half-wave plate 2202A is unnecessary. Similarly, if s-polarized light is emitted from the light source 2200B, the half-wave plate 2202B is unnecessary. Further, in the above-described embodiment, the p-polarized light and the s-polarized light may be reversed.

Further, in the above-described embodiment, the four light beams LBa to LBd are deflected by the single polygon mirror 2104. The configuration, however, is not limited thereto. For example, two polygon mirrors may be provided such that each thereof deflects two light beams.

Further, in the above-described embodiment, if there is no need to consider the increase in wavefront aberration in the cylindrical lenses 2204A and 2204B, the tilt-decentered lenses 2107a to 2107d may be omitted.

Further, in the above-described embodiment, the toner images are transferred to the recording sheet from the photoconductor drums 2030a to 2030d via the transfer belt 2040. The configuration, however, is not limited thereto. The toner images may be directly transferred to the recording sheet.

Further, the image forming apparatus may use, as an image carrier, a color developing medium which develops colors with the thermal energy of the light spot, such as a positive photographic paper. In this case, a visible image is directly formed on the image carrier by optical scanning.

Further, in the above-described embodiment, the optical scanning device 2010 is used in a printer. However, the optical scanning device 2010 is also preferably applicable to an image forming apparatus other than the printer, such as a copier, a facsimile machine, and a multifunction machine having the functions of these apparatuses, for example.

The above-described embodiments are illustrative and do not limit the present invention. Thus, numerous additional modifications and variations are possible in light of the above teachings. For example, elements or features of different illustrative and embodiments herein may be combined with or substituted for each other within the scope of this disclosure and the appended claims. Further, features of components of the embodiments, such as number, position, and shape, are not limited to those of the disclosed embodiments and thus may be set as preferred. It is therefore to be understood that, within the scope of the appended claims, the disclosure of the present invention may be practiced otherwise than as specifically described herein.

What is claimed is:

1. An optical scanning device which separately scans a plurality of scan target surfaces in a first direction with light, the optical scanning device comprising:

a light source device configured to emit a first light beam and a second light beam corresponding to two different scan target surfaces of the plurality of scan target surfaces;

an optical deflector including a reflection surface on which the first light beam and the second light beam emitted from the light source device are obliquely incident while being separated from each other in a second direction perpendicular to the first direction, and configured to deflect the first light beam and the second light beam;

a scanning lens disposed on respective optical paths of the first light beam and the second light beam deflected by the optical deflector; and a branching optical element configured to transmit therethrough a major portion of the first light beam transmitted through the scanning lens and reflect a major portion of the second light beam transmitted through the scanning lens, wherein, when the first light beam and the second light beam deflected by the optical deflector are projected on a plane perpendicular to the first direction, the first light beam and the second light beam are separate from each other in the second direction when deflected from the optical deflector, intersect in the second direction between the optical deflector and the branching optical element, and are separate from each other in the second direction when entering the branching optical element.

2. The optical scanning device according to claim 1, wherein the scanning lens includes an incident surface having an effective scanning area and an emission surface, and wherein, when the first light beam and the second light beam traveling toward a center in the first direction of the effective scanning area in the incident surface of the scanning lens are projected on the plane, the first light beam and the second light beam intersect between the optical deflector and the incident surface of the scanning lens.

3. The optical scanning device according to claim 1, wherein the scanning lens includes an incident surface having an effective scanning area and an emission surface, and wherein, when the first light beam and the second light beam incident on a center in the first direction of the effective scanning area in the incident surface of the scanning lens are projected on the plane, the first light beam and the second light beam intersect between the emission surface of the scanning lens and the branching optical element.

4. The optical scanning device according to claim 1, wherein the scanning lens includes an incident surface having an effective scanning area and an emission surface, and wherein, when the first light beam and the second light beam incident on a center in the first direction of the effective scanning area in the incident surface of the scanning lens are projected on the plane, the first light beam and the second light beam intersect between the incident surface and the emission surface of the scanning lens.

5. The optical scanning device according to claim 4, wherein the first light beam and the second light beam incident on the center in the first direction of the effective scanning area in the incident surface of the scanning lens intersect a generatrix of the scanning lens and are emitted from the emission surface of the scanning lens.

6. The optical scanning device according to claim 1, further comprising a line image forming element provided between the light source device and the optical deflector shared by the first light beam and the second light beam, and configured to form respective line images of the first light beam and the second light beam on the reflection surface of the optical deflector.

7. The optical scanning device according to claim 6, wherein the first light beam and the second light beam emitted from the light source device travel toward the line image forming element, while an interval between the first light beam and the second light beam is increased in the second direction, and wherein the first light beam and the second light beam emitted from the line image forming element travel toward the optical deflector, while the interval between the first light beam and the second light beam is reduced in the second direction.

8. The optical scanning device according to claim 6, further comprising:

an optical member provided on and configured to change at least one of the optical path of the first light beam transmitted through the branching optical element and the optical path of the second light beam reflected by the branching optical element, wherein the optical member includes an incident surface and an emission surface which are non-power surfaces not parallel to each other, and at least one of which is a tilt-decentered surface, and wherein an amount of deviation from parallelism of the incident surface and the emission surface of the optical member changes in accordance with the position of the optical member in the second direction.

9. The optical scanning device according to claim 8, further comprising:

a set of turning mirrors by which one of the first and second light beams transmitted through the optical member is guided to a corresponding scan target surface.

10. The optical scanning device according to claim 1, further comprising an optical housing including a first emission window configured to transmit therethrough the first light beam transmitted through the branching optical element, and a second emission window configured to transmit therethrough the second light beam reflected by the branching optical element.

11. An image forming apparatus comprising:

a plurality of image carriers each configured to carry an image; and an optical scanning device according to claim 1, configured to scan the plurality of image carriers with light beams modulated in accordance with image data.

12. The optical scanning device according to claim 1, wherein the respective optical paths of the first light beam and the second light beam deflected by the optical deflector overlap each other.

* * * * *